(12) United States Patent
Centore, III

(10) Patent No.: US 6,909,879 B1
(45) Date of Patent: Jun. 21, 2005

(54) METHODS AND APPARATUS FOR UTILIZING RADIO FREQUENCY SPECTRUM SIMULTANEOUSLY AND CONCURRENTLY IN THE PRESENCE OF CO-CHANNEL AND/OR ADJACENT CHANNEL TELEVISION SIGNALS

(75) Inventor: Michael A. Centore, III, Dunellen, NJ (US)

(73) Assignee: Cellco Partnership, Bedminster, NJ (US)

( * ) Notice: Subject to any disclaimer, the term of this patent is extended or adjusted under 35 U.S.C. 154(b) by 876 days.

(21) Appl. No.: 09/919,856

(22) Filed: Aug. 2, 2001

Related U.S. Application Data

(60) Provisional application No. 60/226,691, filed on Aug. 22, 2000.

(51) Int. Cl.$^7$ .................................................. H04B 1/00
(52) U.S. Cl. .................... 455/63.1; 455/3.03; 455/63.2; 455/73
(58) Field of Search ........................... 455/1, 301, 303, 455/62, 63.1, 63.2, 63.3, 67.13, 68, 71, 73, 296, 447

(56) References Cited

U.S. PATENT DOCUMENTS

| | | | | |
|---|---|---|---|---|
| 4,639,932 A | * | 1/1987 | Schiff | 375/147 |
| 4,893,349 A | * | 1/1990 | Eastmond et al. | 455/205 |
| 5,187,806 A | * | 2/1993 | Johnson et al. | 455/15 |
| 5,448,754 A | * | 9/1995 | Ho et al. | 455/454 |
| 5,496,966 A | * | 3/1996 | Hightower et al. | 174/35 MS |
| 5,548,819 A | * | 8/1996 | Robb | 455/59 |
| 5,991,628 A | * | 11/1999 | Pedziwiatr et al. | 455/443 |
| 6,046,701 A | * | 4/2000 | Carey et al. | 343/753 |
| 6,243,427 B1 | * | 6/2001 | Stockton et al. | 375/308 |
| 6,563,812 B1 | * | 5/2003 | De | 370/342 |

* cited by examiner

Primary Examiner—Bing Q. Bui
(74) Attorney, Agent, or Firm—McDermott Will & Emery LLP

(57) ABSTRACT

To address the scarcity of radio frequency (RF) spectrum, the disclosed systems offer unique ways to mitigate interference between television broadcasters (including their direct audience and viewers served via cable television) and other concurrent users of the RF spectrum, e.g. for one-way or two-way wireless communication. A preferred embodiment makes use of the "framing" characteristics of the "letterbox" video display format. RF emissions of the simultaneous RF spectrum user are keyed "on" only or substantially only during the time intervals when the blanking intervals and/or letterbox-border video lines are being scanned on the display, i.e. when the potentially affected (interfered with) television display is in the letterbox-frame-scanning portions of each video field. The concurrent uses may support services for voice (including telephony, music etc.), data (including Internet, intranet, etc.); image or control; fixed, portable, mobile or nomadic; narrowband, broadband or ultra-wideband; radiodetermination, diathermy, etc.

66 Claims, 27 Drawing Sheets

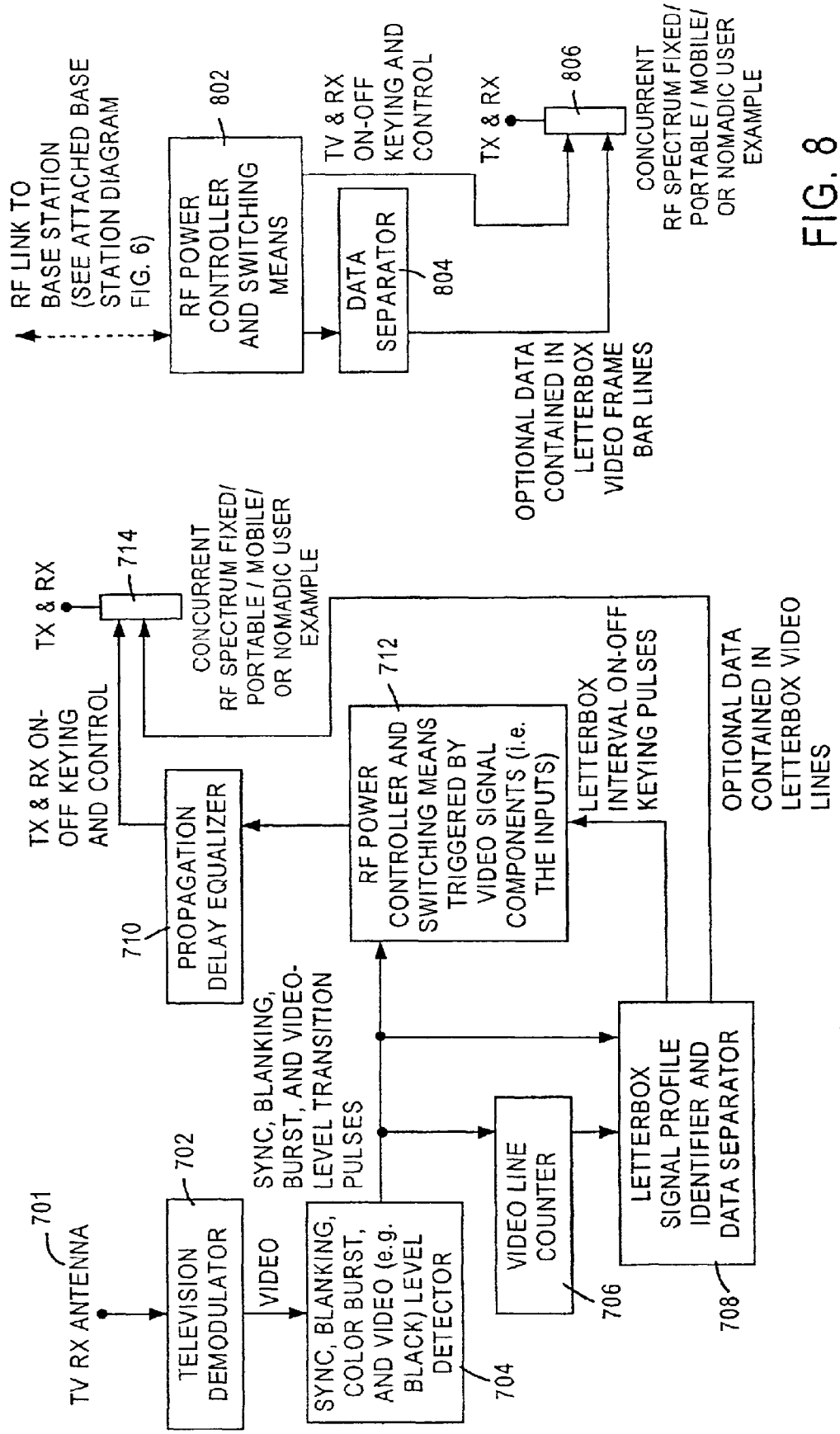

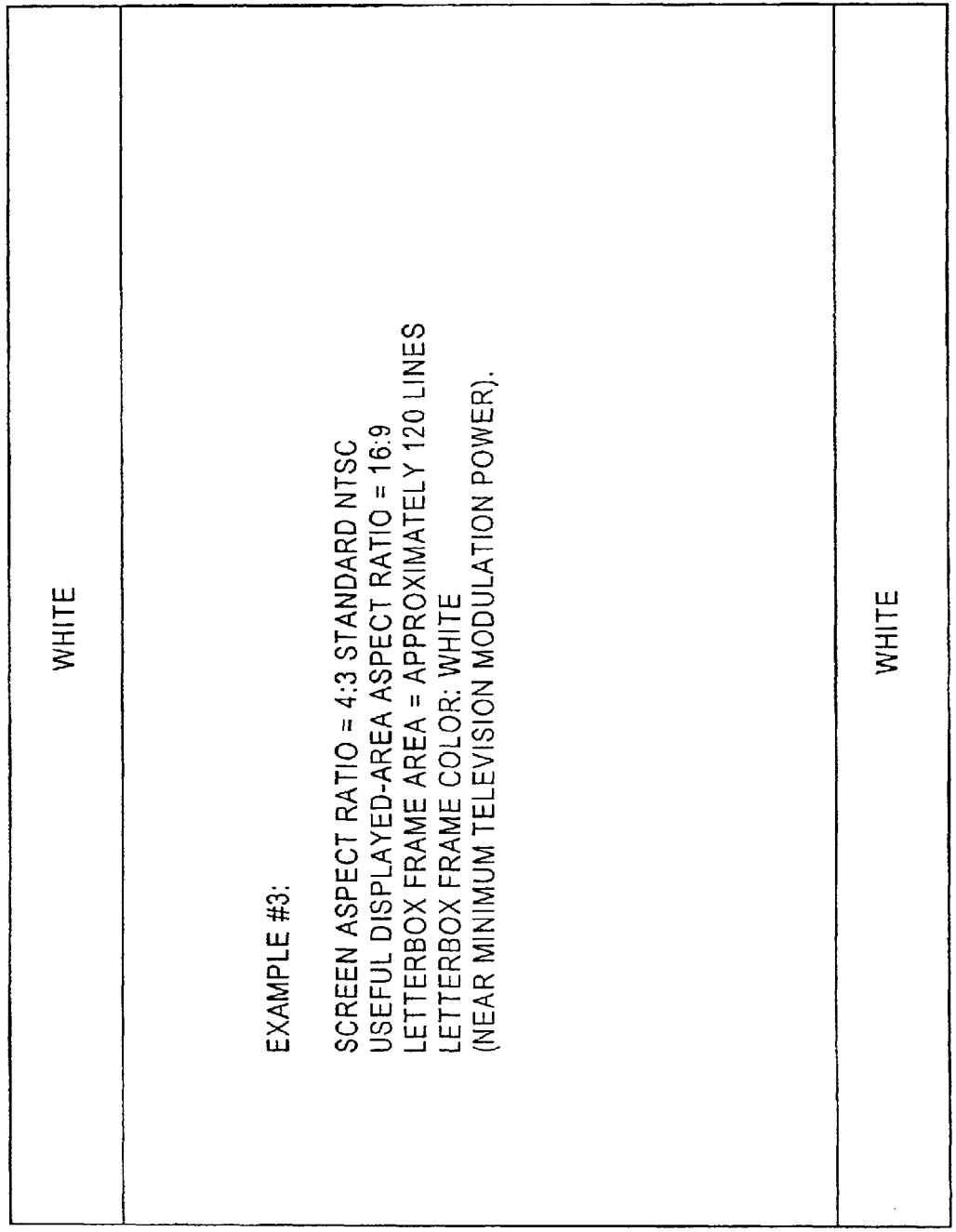

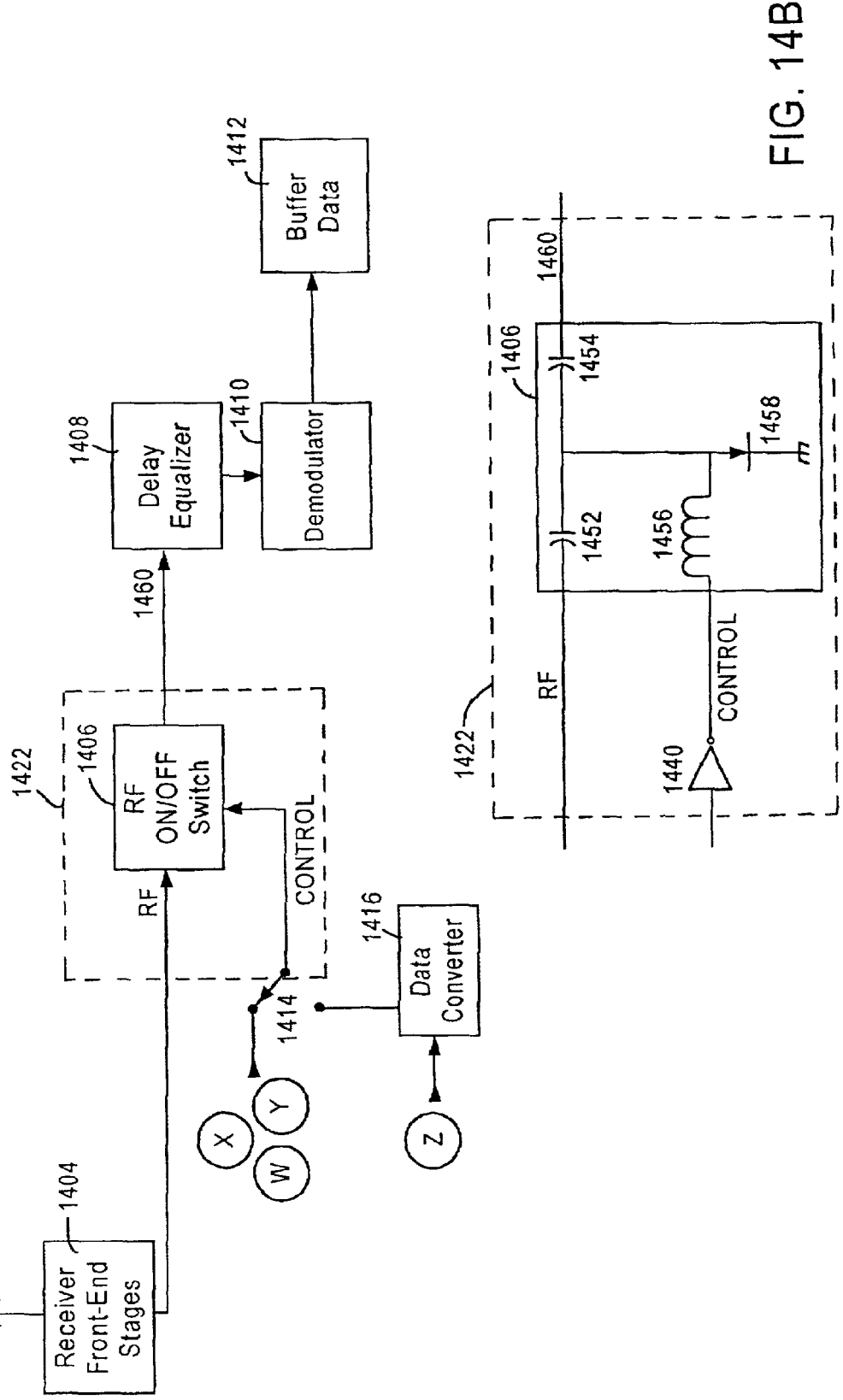

METHODS AND APPARATUS FOR UTILIZING RADIO FREQUENCY SPECTRUM SIMULTANEOUSLY AND CONCURRENTLY IN THE PRESENCE OF CO-CHANNEL AND/OR ADJACENT CHANNEL TELEVISION SIGNALS

RELATED APPLICATIONS

This application, claims benefit of U.S. Provisional Patent Application Ser. No. 60/226,691, filed Aug. 22, 2000 entitled "METHODS AND APPARATUS FOR UTILIZING RADIO FREQUENCY SPECTRUM SIMULTANEOUSLY AND CONCURRENTLY IN THE PRESENCE OF CO-CHANNEL AND/OR ADJACENT CHANNEL TELEVISION SIGNALS", the disclosures of which are incorporated herein entirely by reference.

FIELD OF THE INVENTION

The concepts involved in the present invention relate to techniques for mitigating interference between wireless mobile communications and concurrent operations of broadcast television services on the same or adjacent frequency bands.

BACKGROUND

The wireless communication industry is characterized by rapid growth in demand for services under constraints on the amount of licensed radio frequency spectrum available. These conditions have served as an impetus for users to be as spectrum efficient as advances in the state of the technology allow. Cellular radio is a prominent example of a spectrum-efficient design in which low power base stations reuse the same sets of radio channels hundreds or thousands of times (e.g. for thousands of simultaneous phone calls) within a given geographic area. Digital radio is an additional improvement that allows each radio channel or frequency band to carry more information compared to the same spectrum used in older "analog" radio designs. Cellular radio, digital radio and other advancements have resulted in greater traffic capacity and the ability of wireless communications companies to serve more customers within the prevailing spectrum constraints.

Even with aggressive infrastructure deployment and improvements in technology, however, demand for wireless services has exceeded available capacity in areas with the highest customer concentrations. Limits on the availability of additional licensed spectrum are a binding constraint in need of relaxation and supplementation to allow further growth. In response, the Federal Communications Commission (FCC), at the direction of the United States Congress, continues to aggressively auction additional spectrum to the highest bidder, subject to its auction rules and conditions. The spectrum auctions generate revenue for the United States Treasury while transferring spectrum licenses to those who (in theory) place the highest value on the spectrum.

Unfortunately, the auctioned-and-transferred spectrum often has existing, incumbent users that must be moved to other spectrum or induced to cease operations before the auction winner can effectively use the newly purchased spectrum. Further, the law often protects incumbent users from radio interference from new licensees.

As an example, consider FIG. 1 which illustrates the planned auction of UHF spectrum in the 700 MHz band. The FCC's strict regulatory stance on protecting incumbent television stations in the Ultra High Frequency (UHF) band provides a case-in-point that illustrates the need for the invention described herein. The UHF bands in the 747–762 and 777–792 MHz ranges were originally licensed for UHF television broadcast services. The 747–762 MHz band includes television channels 60, 61 and 62, whereas the 777–792 MHz band includes television channels 65, 66 and 67 (see FIG. 1). A number of stations are operating on these channels and/or adjacent channels, particularly in or around certain major metropolitan areas, however, many large regions of the country do not receive any broadcasts on these channels (see maps shown in FIGS. 2A to 2J).

FCC Auction #31 for the 747–762 and 777–792 MHz bands is scheduled to begin on Mar. 6, 2001. The auction was postponed as several potential bidders publicly requested that Congress and the FCC delay the auction while the FCC considers better ways to resolve the spectrum encumbrances and other important matters. Additional spectrum, including encumbered spectrum in the 700 MHz band and in other bands, is slated to be made available in the future.

The presence of high power television broadcast signals generally serves as a technical impediment or is technically mutually exclusive to the other highly valued uses (e.g. wireless communications) intended by the auction winners and, indeed, by the FCC itself. Many planned wireless services that might utilize this band would be subject to severe interference from such television signals. Similarly, the operation of the new wireless communication services on such bands, in close geographic proximity to the television stations and their customers, would interfere with reception of the television broadcast signals.

The FCC, however, ordered the auction of these portions of the UHF-TV band without first clearing the band of incumbent television broadcasters. In fact, for many years to come, the relevant law protects the television broadcasters from harmful interference from new licensees. The FCC's long-term plan is designed to encourage the migration of all television broadcasters to other spectrum reserved for digital television (DTV). Their plan calls for television broadcast stations to convert from analog transmission to DTV transmission and to move to the DTV channels by 2006; provided that the market penetration of DTV receivers achieves high enough levels (defined as approximately 85 percent in major markets) by 2006. If the FCC's stated DTV household penetration is not achieved, however, it is conceivable that incumbent television broadcasters could remain on their present channels (and/or simulcast) until much later, perhaps until 2014. These uncertainties and delays are daunting problems for auction winners who may need to invest heavily to acquire the spectrum and may need to use it immediately to meet customer demands.

Hence a need exists for a technique to allow increasing use of spectrum by new wireless communication services in the presence of existing broadcast stations that may be on the same or adjacent channels. A need exists to allow nearly concurrent use in increasing geographic areas that encroach on existing users, while mitigating interference problems.

SUMMARY OF THE INVENTION

The situation described above drives the need for the invention taught herein, which provides for the practical, simultaneous use of spectrum that is already occupied by incumbent television broadcast users. Broadcast users, as used herein, includes stations engaged in television broadcast services, Instructional Television Fixed Services, Multipoint Distribution Services, Multichannel Multipoint Distribution Services, and any television transmission regardless of power level; users of transmitters, translators, boosters, repeaters, point to point and point-to-multipoint television signal distribution services; receivers of the respective transmissions; and the use of systems on any frequency band (e.g., VHF, UHF, microwave, millimeter-wave, etc.) to transmit or receive a television signal. In developing the methods and apparatus to practice this invention, the scope of what has been accomplished includes the simultaneous use of spectrum occupied by television signals generally, regardless of medium (e.g. broadcast, cable television, closed circuit television, etc.) and regardless of the type of simultaneous or concurrent use (e.g. licensed or unlicensed; one-way or two-way wireless communications; voice, data, image, or control; fixed, portable, mobile or nomadic; narrowband, broadband or ultra-wideband; radiodetermination; diathermy, etc.)

The interference problems described above can be mitigated through the use of the invention described herein, which provides for the concurrent use of the same or adjacent spectrum over larger geographic areas and with closer spectral and/or geographic proximity between heretofore incompatible users. This invention also creates more cooperative options for minimizing interference to and from all users (new and incumbent).

Several novel means are provided for avoiding and minimizing harmful interference that would otherwise be caused to the video signal in television reception. The invention also provides several cooperative means to facilitate the additional, simultaneous uses of the RF spectrum within or spectrally near the video pass-band of the television signal (but sufficiently separated from the aural carrier of the television transmission) while avoiding mutual interference between users.

A preferred embodiment of this invention makes use of the "framing" characteristics of the increasingly common "letterbox" video display format. The letterbox format is often used to accommodate the differences in aspect ratios between National Television System Committee (NTSC) or other standard video displays (typically having an aspect ratio of 4:3) and programs produced in the Advanced Television Systems Committee (ATSC) or other high definition television (HDTV) formats (typically having an aspect ratio of 16:9). Letterboxing to various extents is also used for the "widescreen" video display of cinematic films having various aspect ratios.

Typically, letterbox borders are seen as horizontal black bars at the top and bottom of the screen. In preferred embodiments of this invention, the RF emissions of one or more simultaneous RF spectrum users are keyed "on" only or substantially only during the time intervals when the letterbox-border video lines are being scanned on the display, i.e. when the potentially affected (interfered with) television display is in the letterbox-frame-scanning portions of each video field.

Temporal analysis of a range of popular letterbox practices and the corresponding video line-times has led to the discovery herein that nominally 19.20 to 42.66 percent of a television signal's transmission time can be simultaneously used by other RF spectrum users (e.g. for wireless communications). By also keying the concurrent RF spectrum user "on" during certain parts of non-displayed (overscanned) synchronization and/or blanking intervals that are part of every NTSC (or other video standard) field, the above temporal analysis percentages can be marginally increased.

This invention teaches that by limiting the concurrent RF user's transmission time to the letterbox-border video linetimes and/or to the non-displayed intervals of each video field, interference to the active picture content of the television signal can be avoided and objectionable visual impacts on the active video can be obscured or minimized.

In NTSC television broadcasting in the U.S., for example, the tips of the synchronizing pulses are transmitted at 100 percent modulation (the maximum amplitude modulated power), blanking ("blacker than black") is transmitted at 75 percent modulation, black (e.g. the letterbox lines) is nominally set up at 67.5 percent modulation, and reference white is transmitted at 12.5 percent modulation. The 100 percent, 75 percent and 67.5 percent modulation levels imply good protection for the television signal's carrier-to-interference ratios at the times when concurrent users are keyed "on" per this invention, and further protection is afforded by the fact that the television display will be either black or blanked during these time intervals. The high modulation percentages associated with television blanking- and black-levels, however, are at odds with minimizing interference to other concurrent RF spectrum users. This invention's capabilities with respect to protecting concurrent RF spectrum users is discussed and resolved in the next paragraph.

For situations where the concurrent user is in need of greater interference protection from a television broadcast station or stations, further embodiments of this invention offer changes in the characteristics of the letterbox-frame video lines. For example, the letterbox-frame lines could be transmitted at a lower modulation percentage, e.g. at or near the white reference level (although this would be visually and practically objectionable if done for prolonged periods). Preferably, other grayscale levels (e.g. nominally 40 percent modulation) would be used with less visual impact. Other preferred embodiments of this invention include modulating the letterbox lines in a random fashion or with a code or codes (including pseudorandom codes) that both obscure the visual impact of the interference to television viewers while intentionally coordinating with and/or inter-working with the concurrent RF spectrum users to minimize the interference to those users.

Another embodiment of this invention enlists the television broadcast station to transmit data during the letterbox-frame video lines that is useful to and/or part of the communications link to the concurrent RF spectrum user. In that mode, the television broadcaster becomes a cooperative part of the communications link (e.g. the downlink) for the concurrent user. Wherever practical, for example, in cable headend equipment or even in receivers, effected bars in received broadcast signals may be replaced with locally generated black bars, to replace the framing before presentation to the viewers.

This invention uses existing components of the video signal, as transmitted, as timing references for keying the transmission and/or reception of concurrent users on and off and/or for power- and sensitivity-control decisions described below during the appropriate time intervals. Preferred embodiments extract timing information alternatively from the video synchronization pulses, chrominance (burst) samples, blanking transitions, triggering based on video (particularly black) levels, and by counting video lines from any reference points in the video transmission. In the television broadcast example, concurrent users (e.g. mobile and base communications users) have this timing information readily available to them virtually anywhere because the nature of the broadcast signal is that it is ambient.

The practical acceptance of this invention is facilitated because many television stations already transmit part of their programming in letterbox formats. This is increasingly due to programs being produced in HDTV that need to be sent in the NTSC (or other standard) mode, film-based movies being broadcast in widescreen format, or simply for the graphic effects that letterbox formats afford. This invention includes devices that facilitate greater use of the letterbox technique. For example, letterbox detection means are presented here as an additional refinement. The invention senses when the letterbox format is or is not in use, inserts the correct format and/or coding when necessary, and prevents double-formatting when the program is already properly letterboxed and/or coded as required.

One aspect of the present invention relates to an RF transmitter, and a method for its operation, that can operate concurrently with a television broadcast wherein this transmitter includes an exciter stage to generate RF signals, an amplifier to amplify and provide these RF signals to an antenna for transmission and a switch that controls whether or not the RF signals are provided to the amplifier. Control circuitry is also included that, based on the television broadcast, generates one or more control signals that control the operation of the switch.

Another aspect of the present invention relates to an RF receiver, and a method for its operation, that can operate concurrently with a television broadcast wherein this receiver includes one or more front-end stages that provides a RF signal, a demodulator that converts these RF signals to user data, and a switch or the like that controls whether or not the RF signals are provided to the demodulator. Control circuitry is also included that, based on the television broadcast, generates one or more control signals that control the operation of the switch.

A further aspect of the present invention relates to a system for a user apparatus and a television broadcast to concurrently use a portion of the radio-frequency spectrum wherein the television broadcast signal comprises a picture portion and a format portion and the user apparatus includes an RF transceiver, a video-signal receiver and control circuitry that generates one or more control signals based on the received video signal. One or both of receive and transmit operations of the transceiver can then be activated according to these control signals.

Another aspect of the present invention relates to a method of operating a transceiver concurrently with a television broadcast that includes the transceiver receiving a video signal of the television broadcast, generating a control signal according to the contents of the video signal and controlling the activation of receiving or transmitting functions according to the control signal.

Additional objects, advantages and novel features of the invention will be set forth in part in the description which follows, and in part will become apparent to those skilled in the art upon examination of the following and the accompanying drawings or may be learned by practice of the invention.

BRIEF DESCRIPTION OF THE DRAWINGS

The drawing figures depict preferred embodiments of the present invention by way of example, not by way of limitations. In the figures, like reference numerals refer to the same or similar elements.

FIG. 7 a block diagram of a first exemplary embodiment of a wireless communication device in accord with aspects of the invention.

FIG. 8 is a block diagram of a second exemplary embodiment of a wireless communication device in accord with aspects of the invention.

FIGS. 9A to 9F are illustrations of television screens showing the aspect ratios of fullscreen displays as well as various letterbox formats.

FIGS. 14A and 14B illustrate a concurrent RF user receiver and an accompanying RF switch according to an embodiment of the invention.

DETAILED DESCRIPTION OF THE PRESENTLY PREFERRED EMBODIMENTS

The inventive interference mitigation relies on keying operations of concurrent wireless users, so that the new users operate in times when the broadcast video signal does not carry useful image content or operate in such a manner as to avoid interfering with the broadcast video signal. There are a number of reasons why television broadcasts today carry programs in "letterbox" format, for example, because the program was adapted to the standard aspect from some other aspect ratio, such as that for HDTV or for wide screen movie presentations. In the letterbox format substantial bars of the visual television signal contain filler, typically black signals. Concurrent wireless operation during the timing of these bars and/or during blanking intervals reduces or eliminates the impact of the concurrent operation on the same or adjacent spectrum, with respect to the useful video information in the actual picture.

Figure 1:
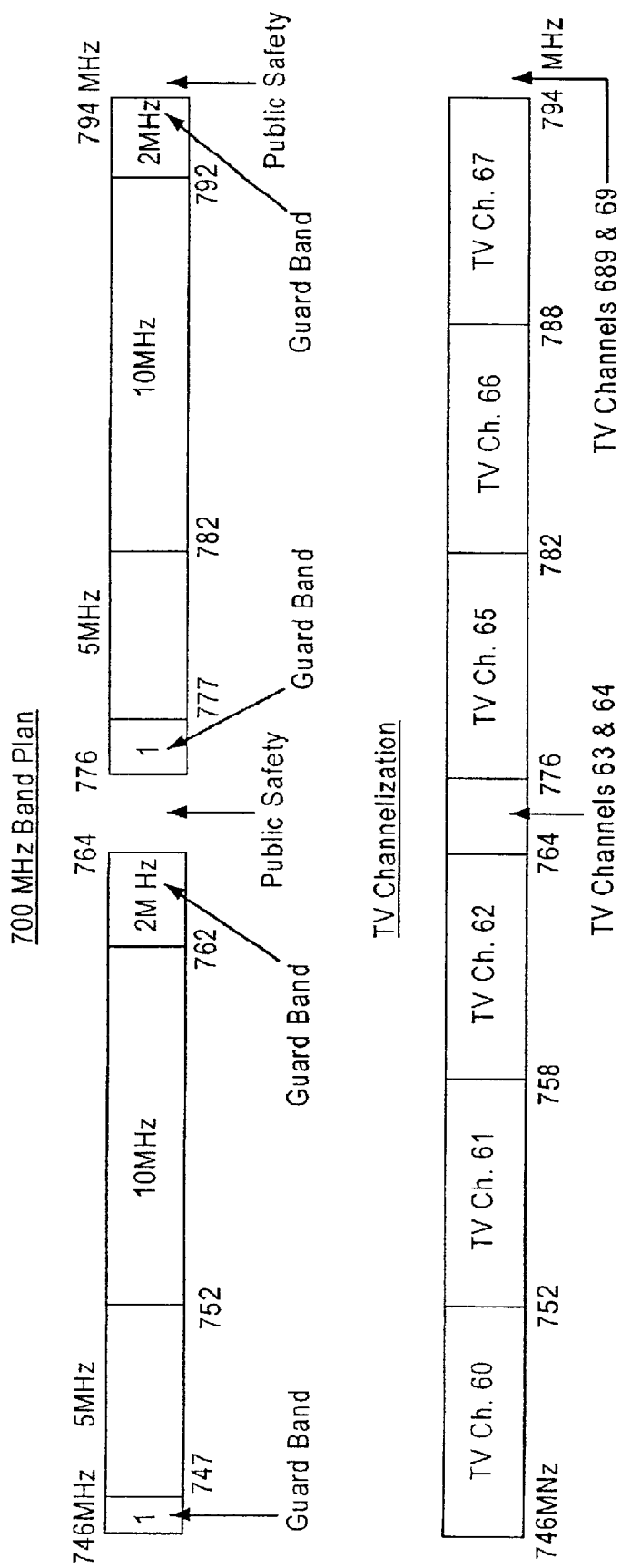
FIG. 1 is a diagram of the existing spectrum allocation and the planned reallocation of spectrum, for a portion of the 700 MHz band.
Figure 2A:
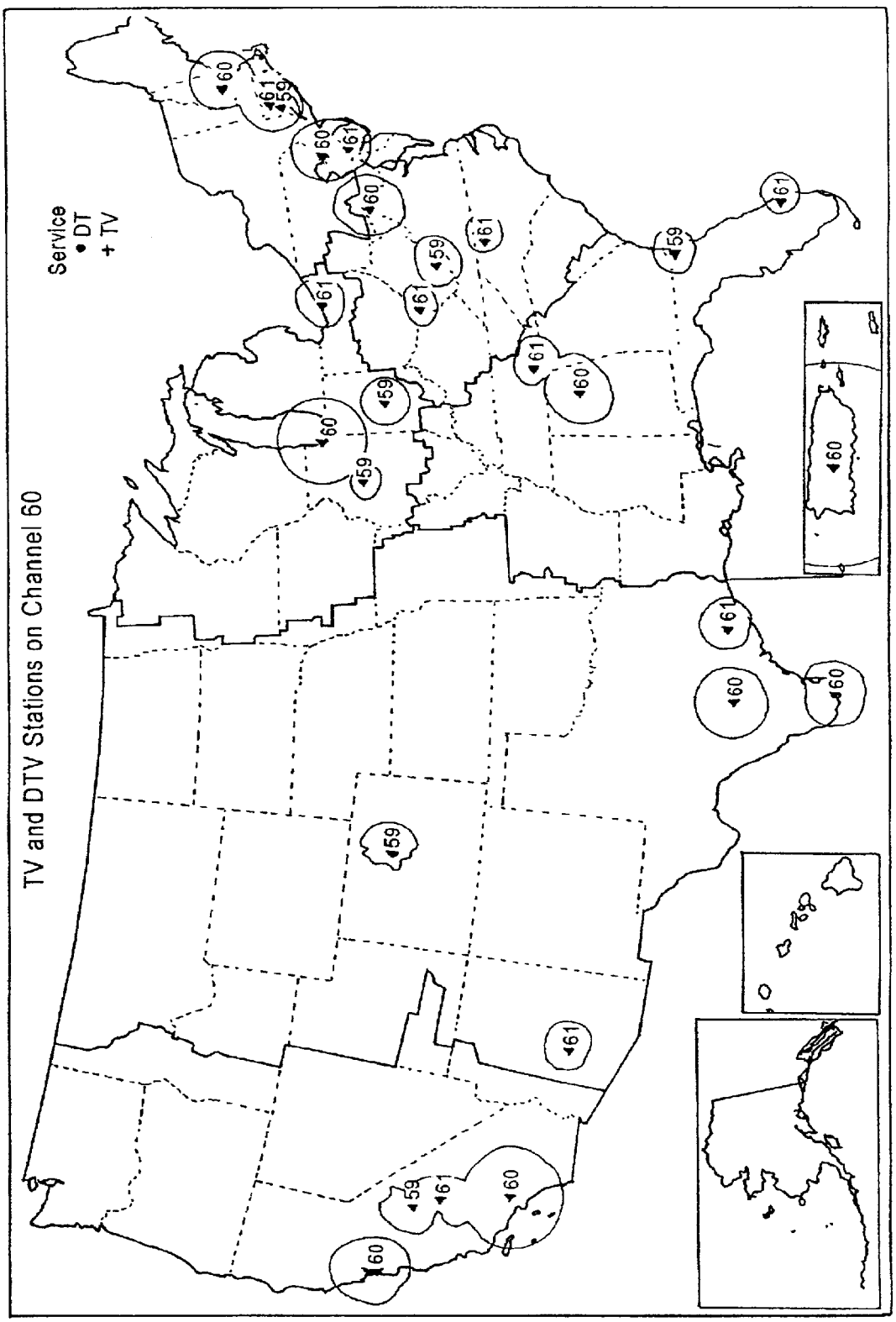
FIGS. 2A to 2J are maps illustrating the existing channel allocations and use thereof throughout the United States, for the UHF channels effected by the spectrum plan for a portion of the 700 MHz band.
Figure 2B:
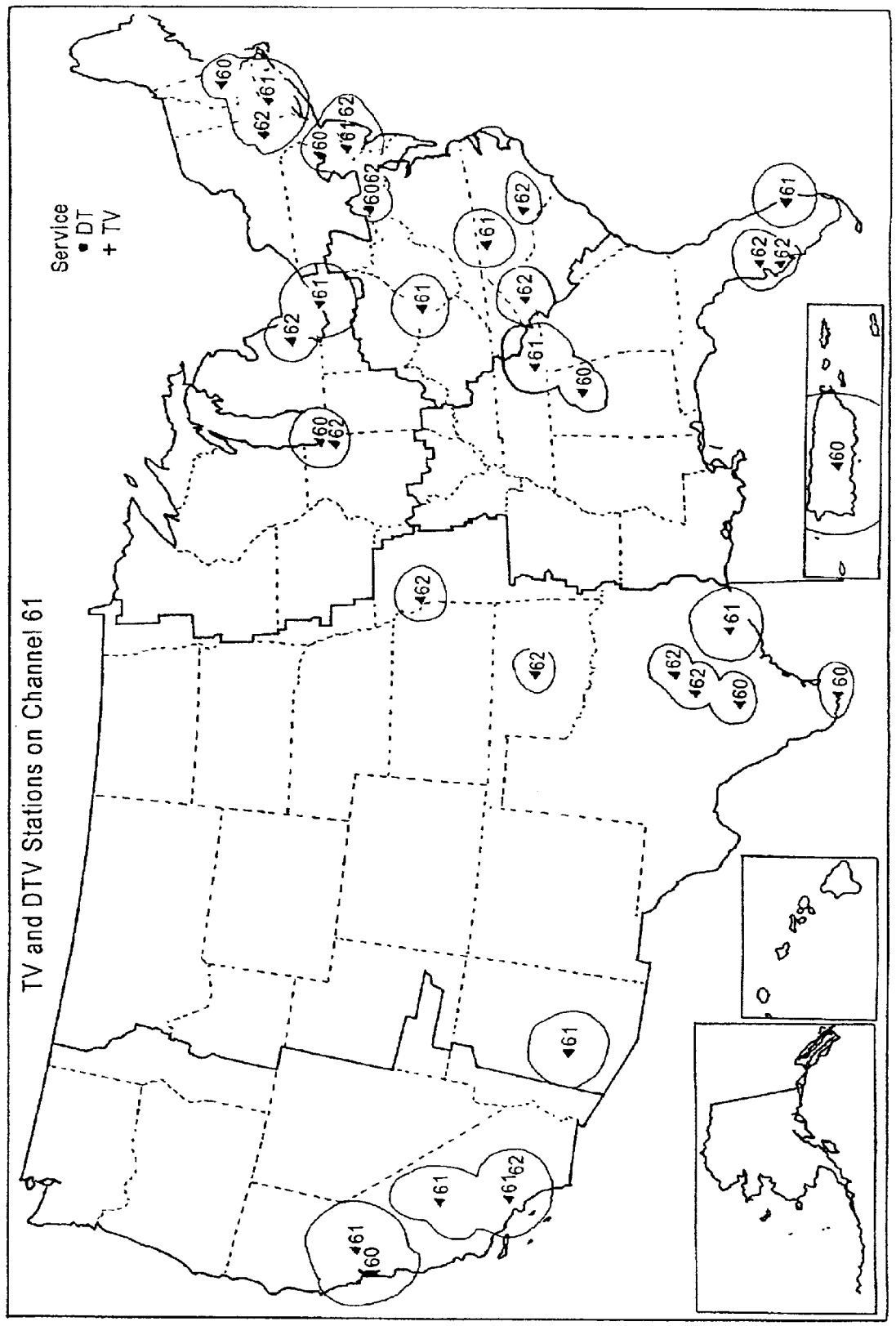
Figure 2C:
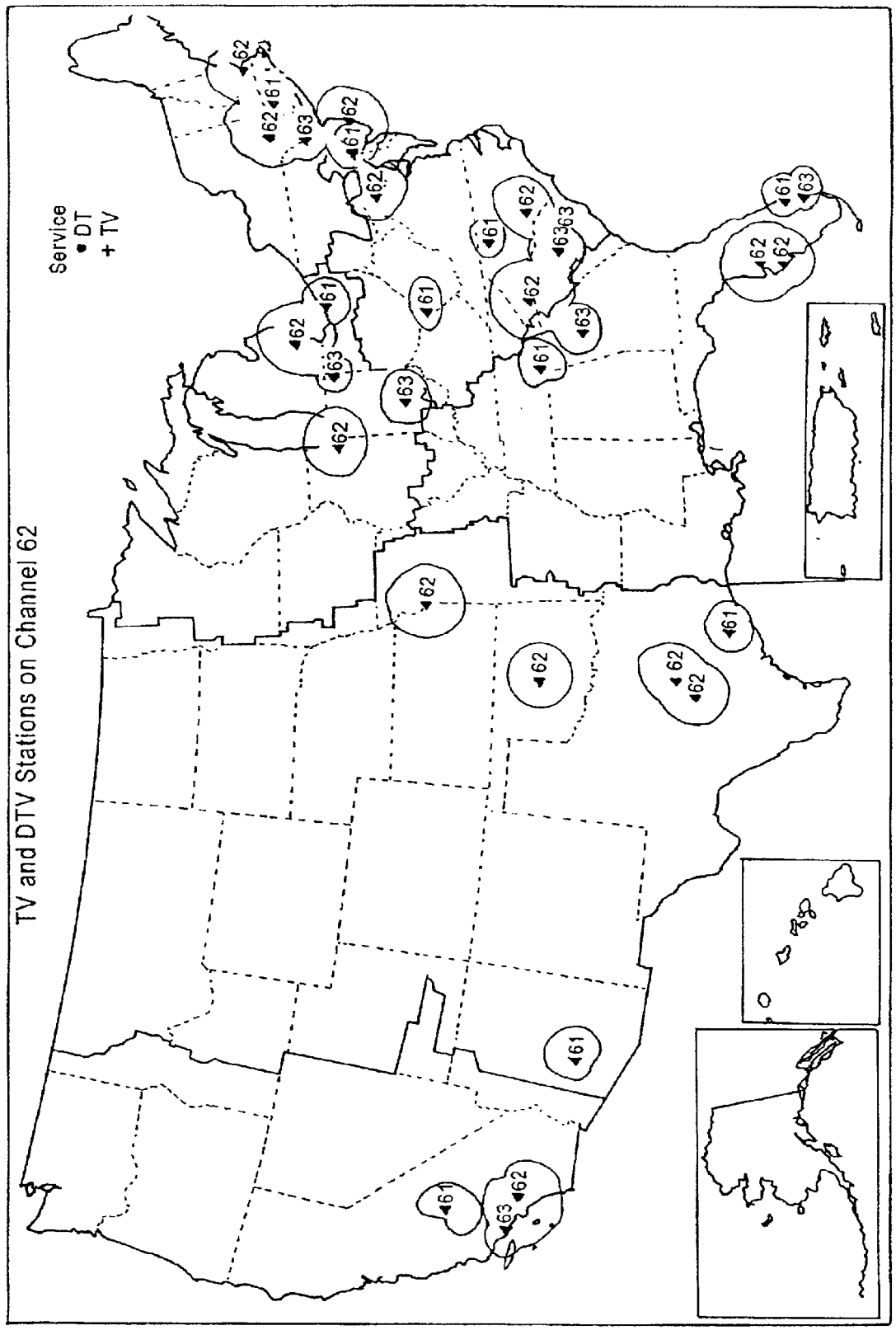
Figure 2D:
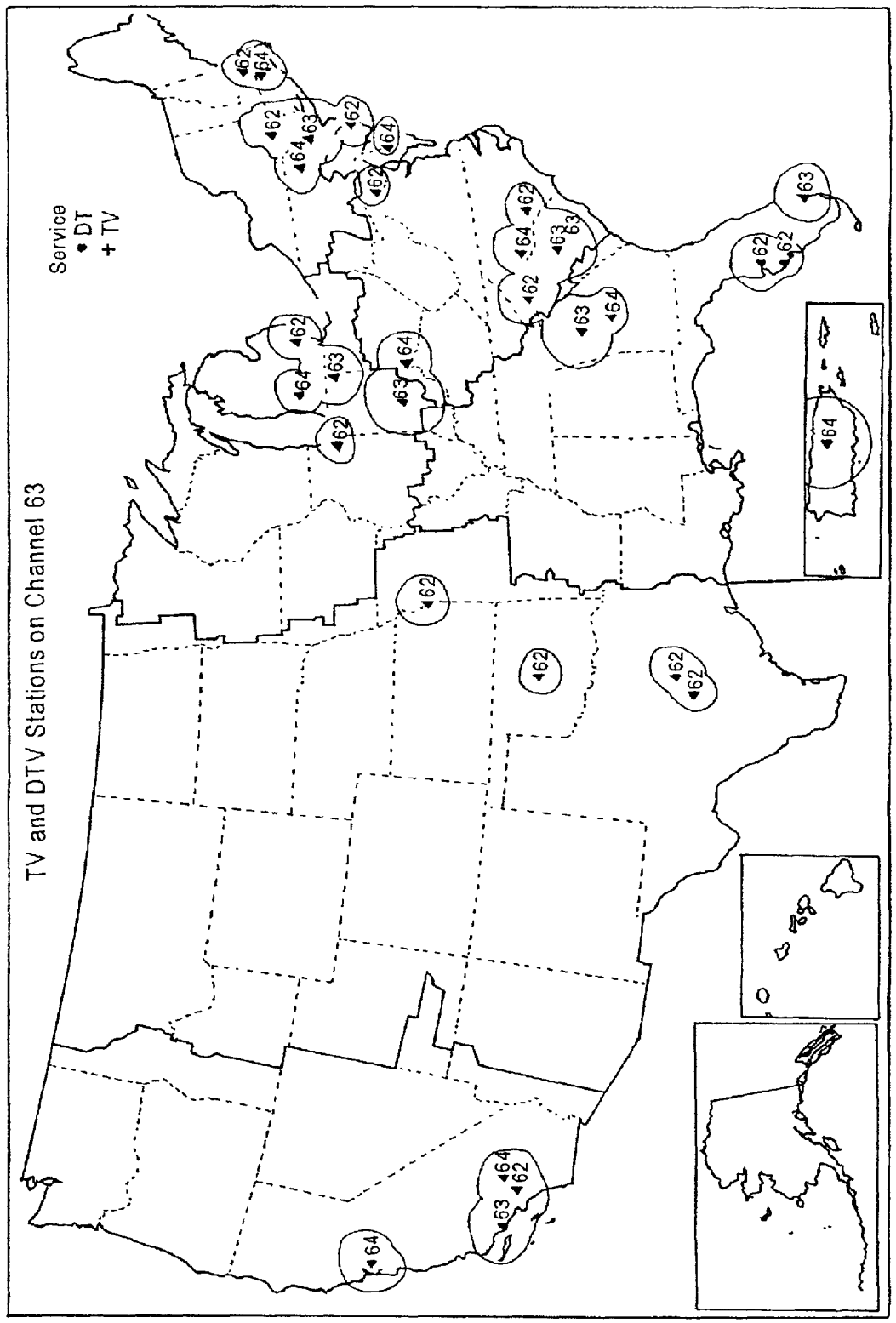
Figure 2E:
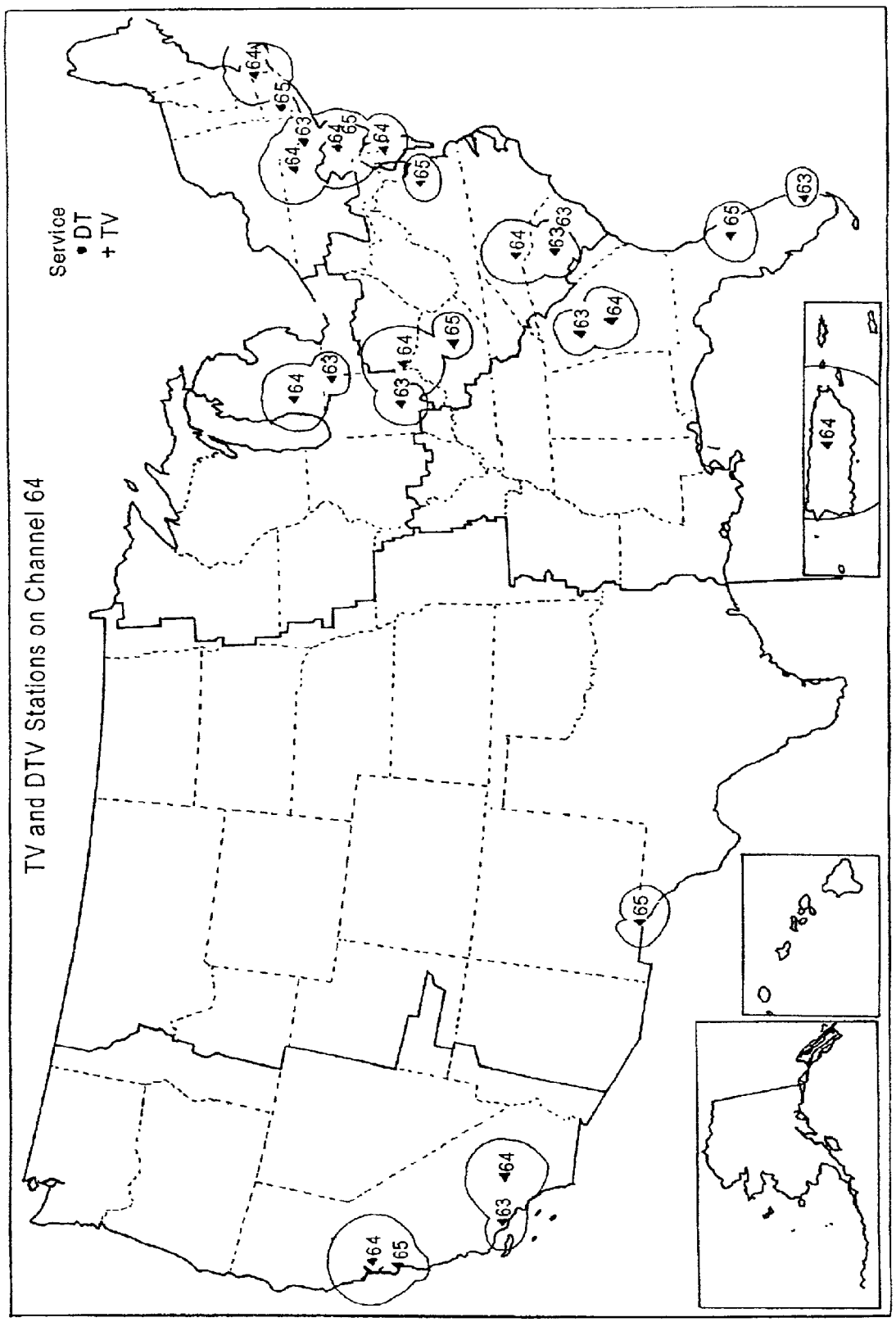
Figure 2F:
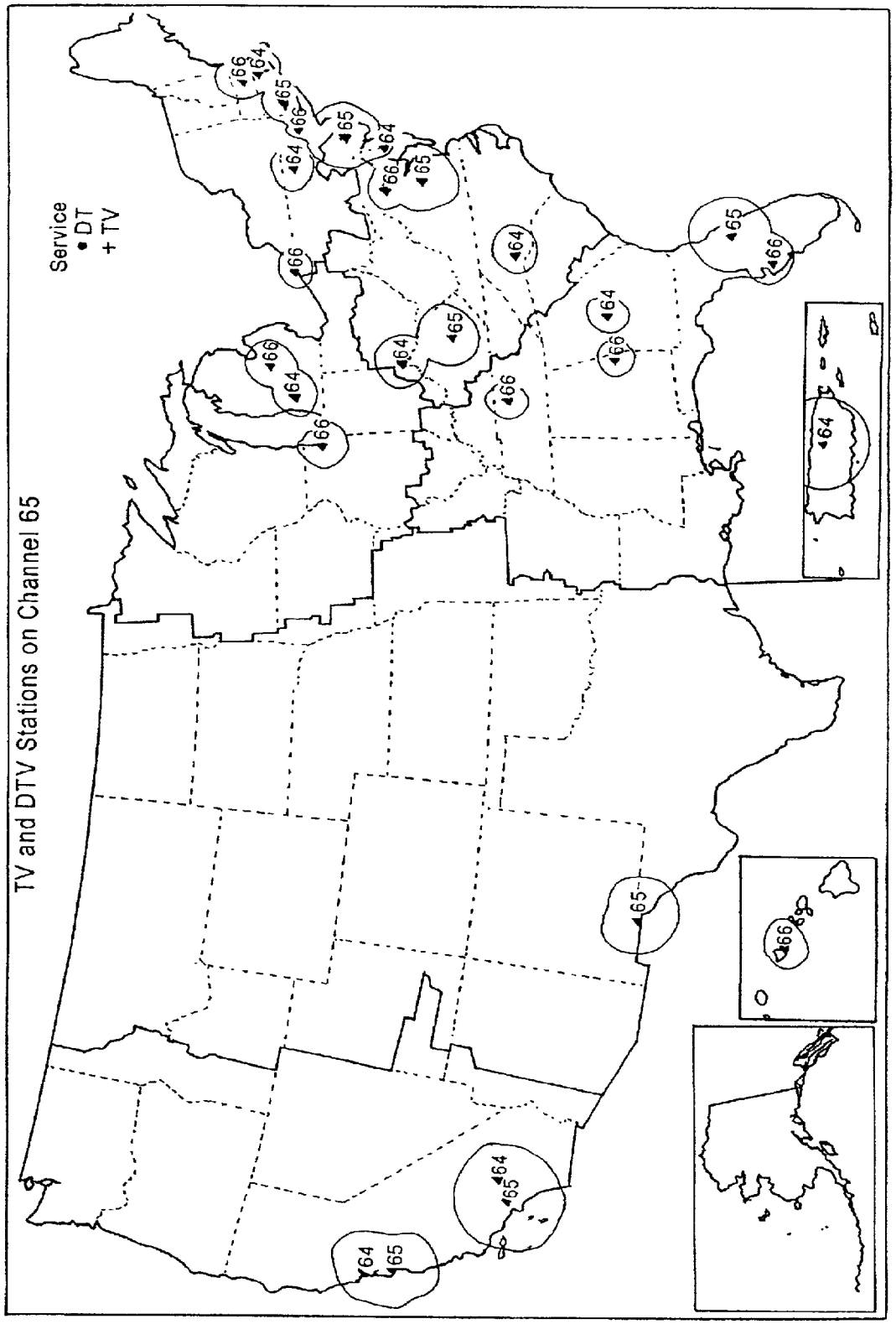
Figure 2G:
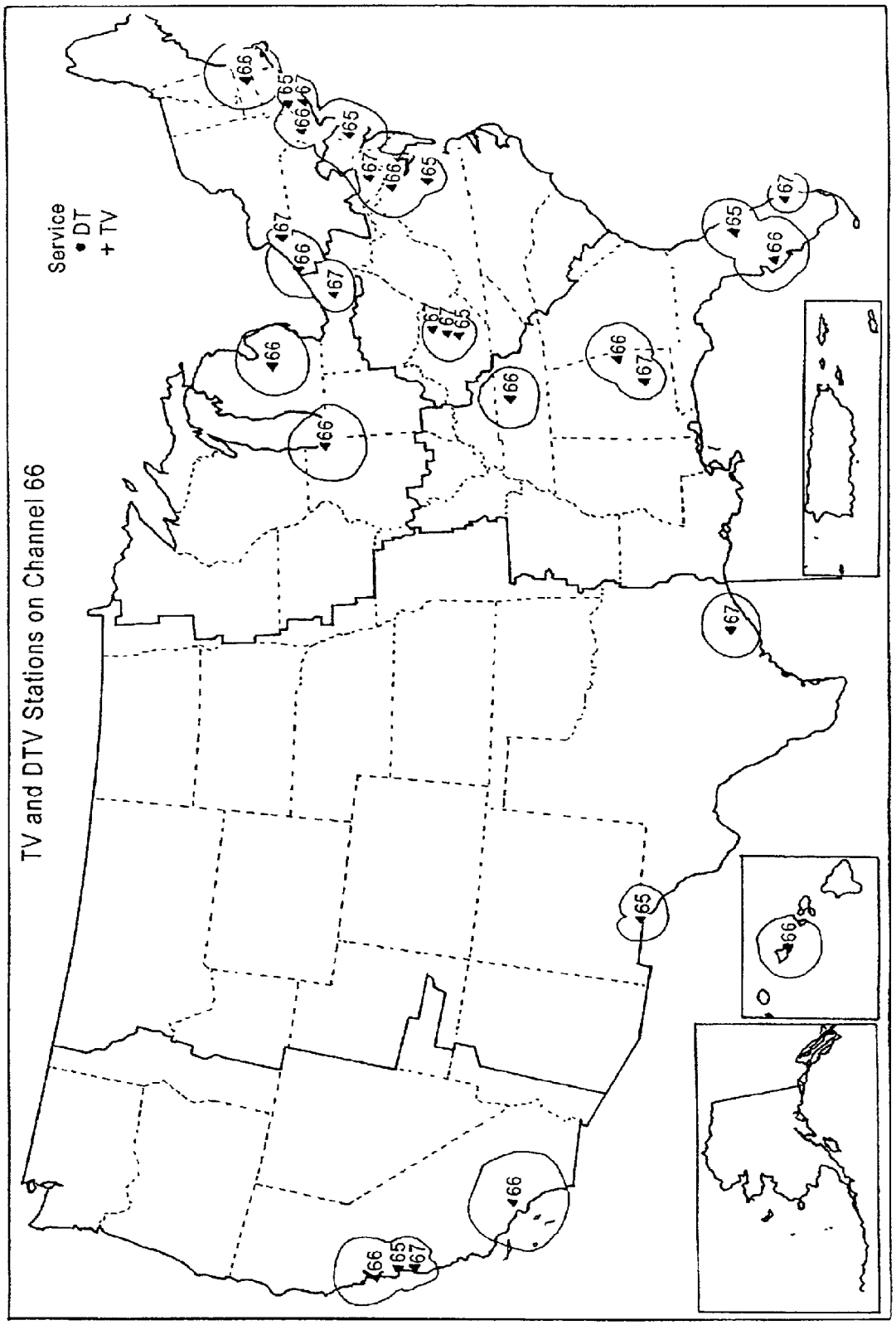
Figure 2H:
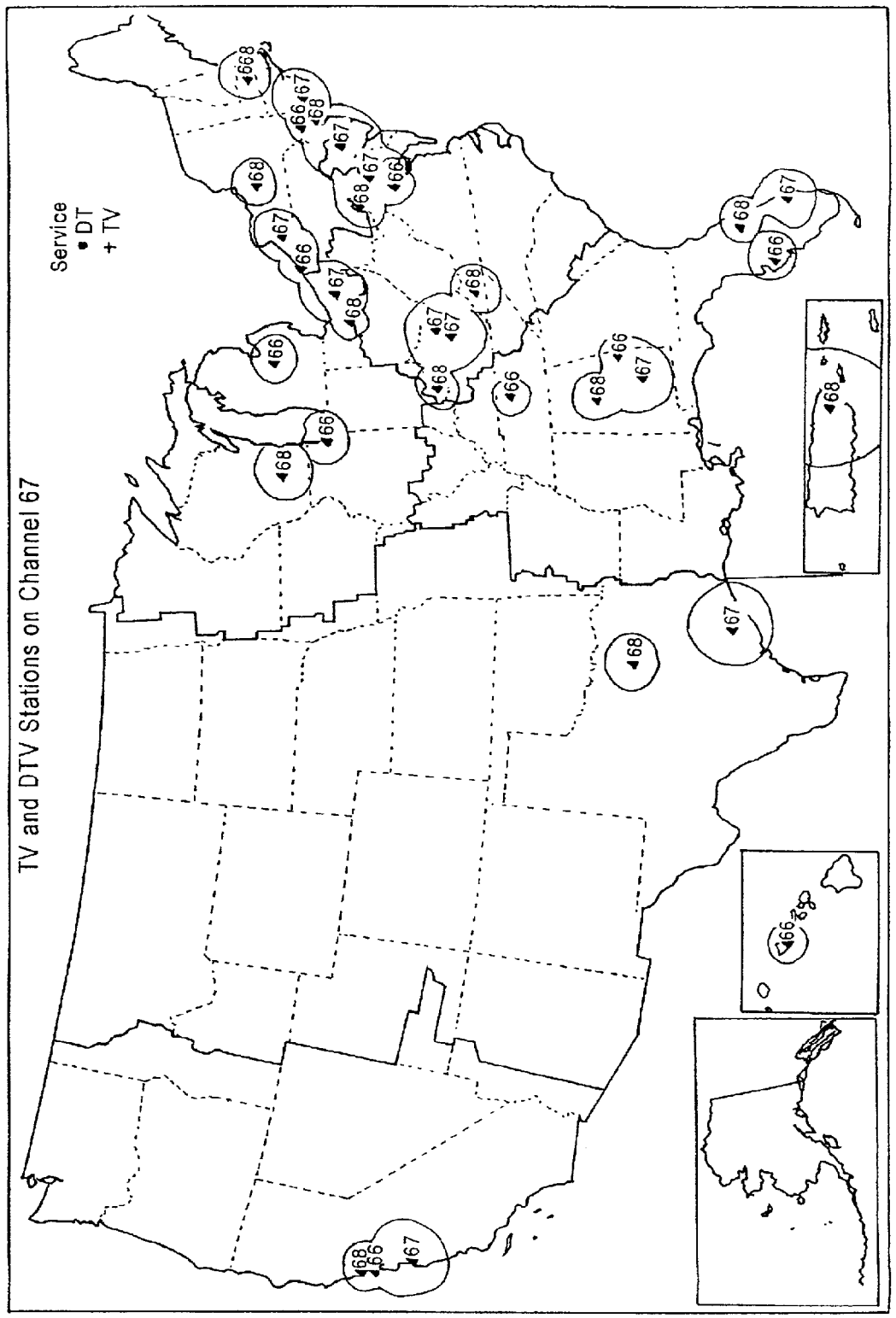
Figure 2I:
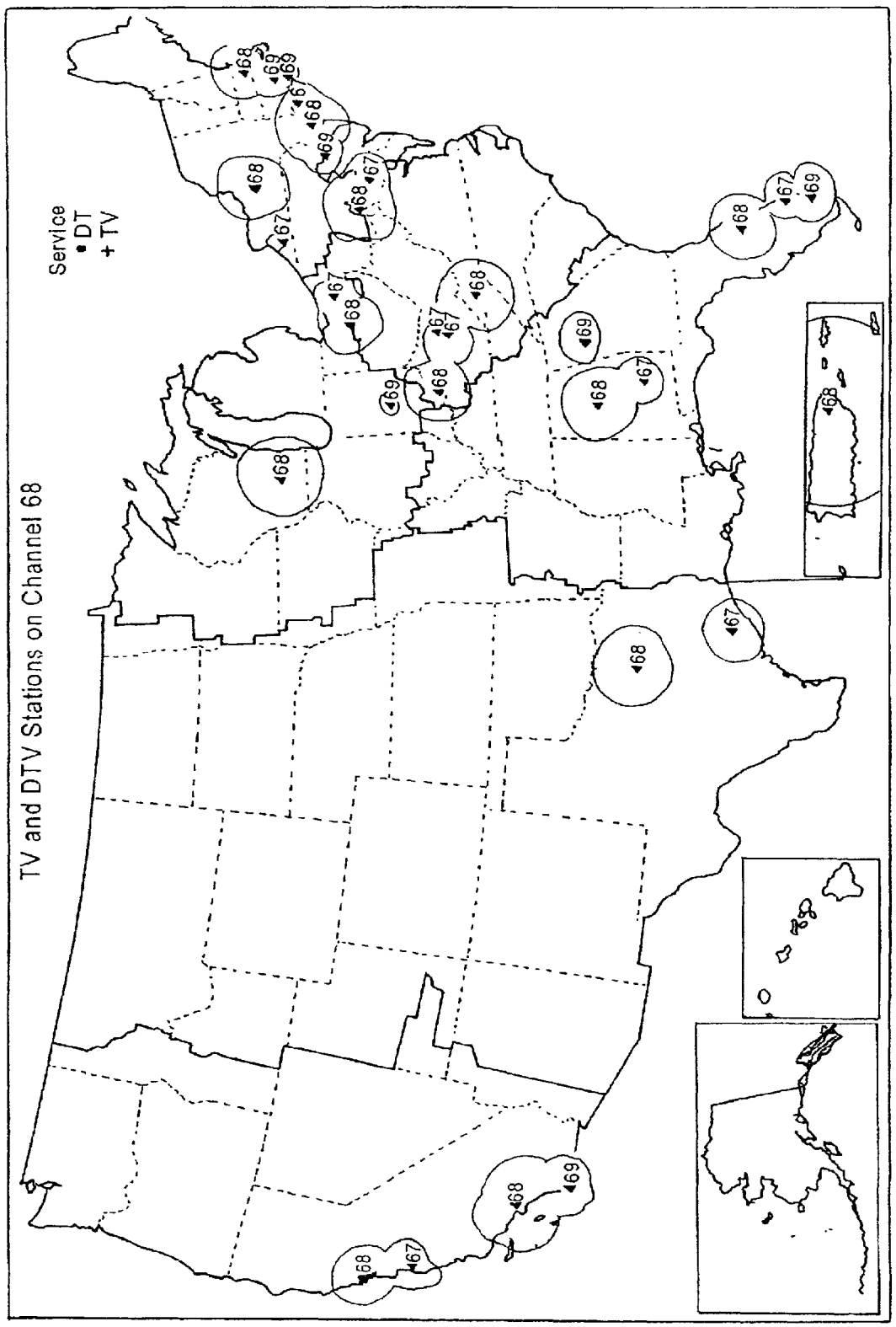
Figure 2J:
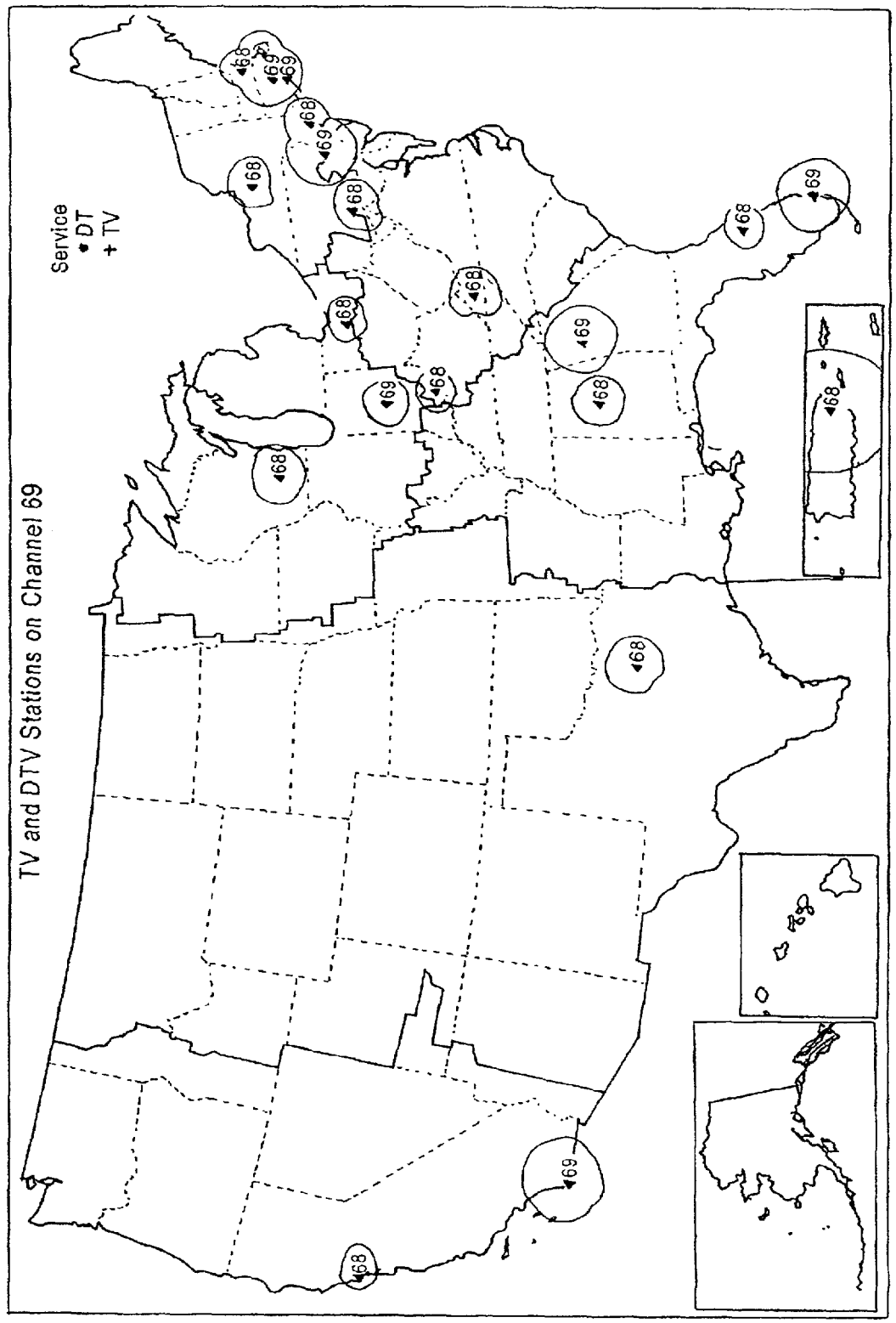
Figure 3:
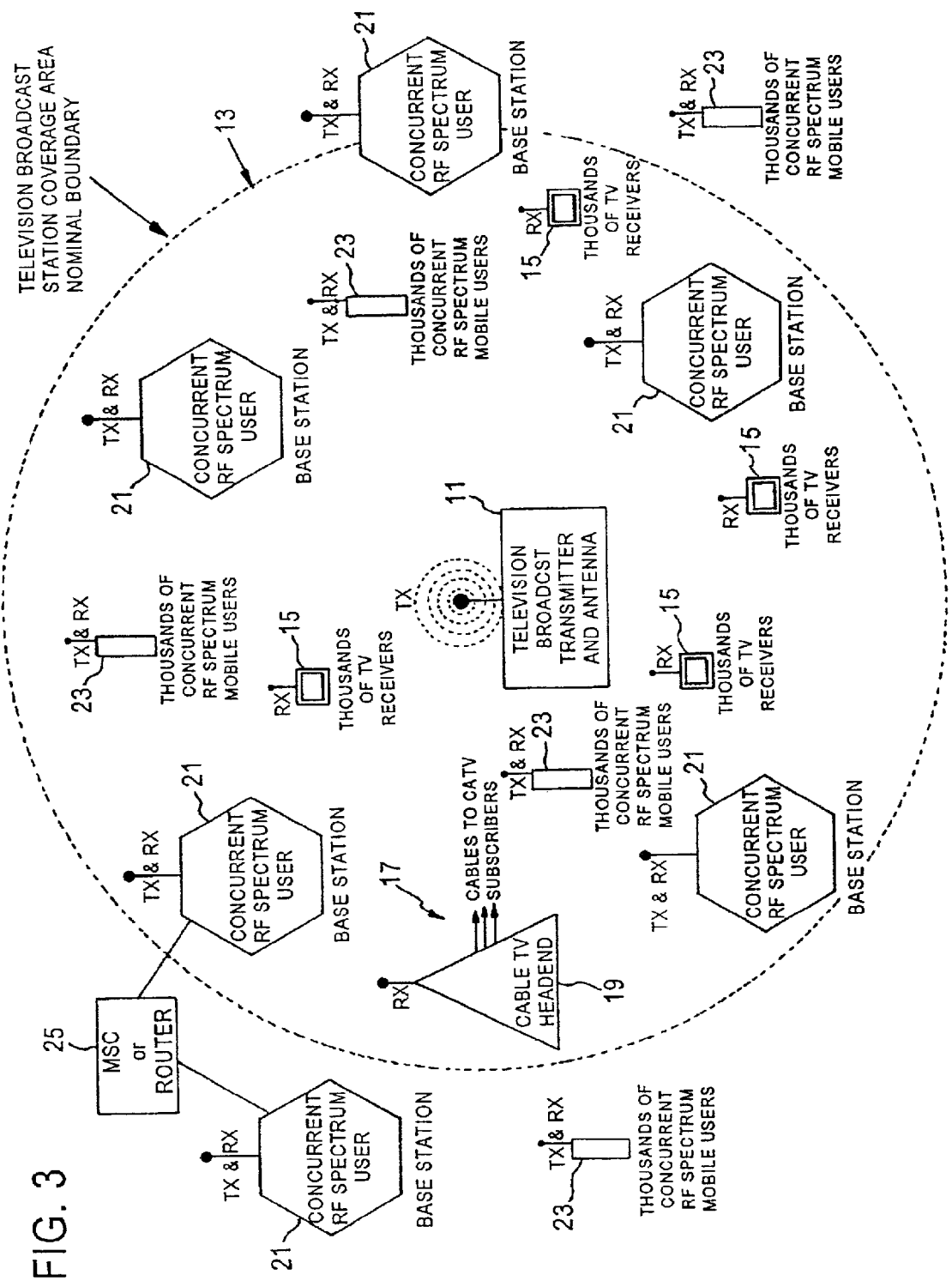
FIG. 3 is a functional block diagram of an exemplary television distribution system and concurrent wireless communication users (base stations and user terminals), which might implement the interference mitigation techniques in accord with the invention.

FIG. 3 is a block diagram of broadcast television and concurrent wireless communication networks, implementing the interference mitigation in accord with the present invention. For purposes of this discussion, the broadcast television transmitter 11 appears at the center of a circular (dotted line) coverage area 13. Within that area 13, the transmitter 11 broadcasts television signals in the analog NTSC format. In accord with the invention, the television transmitter 11 broadcasts a majority of its programming in a letterbox format. Viewers utilize receiving antennas and standard television receivers 15, to receive and view the broadcast programming, in essentially the normal manner. Examples of such receivers 15 appear within the coverage area 13 in the diagram, and the symbols for the receivers show the black bars of the letterbox display format by way of example.

Within the coverage area 13, one or more cable television systems 17 also receive the broadcast television programming from the incumbent television transmitter 11. In operation, the headend 19 of the cable television system 17 receives the broadcast signal, amplifies the signal, and retransmits the signal over a coaxial cable network to its subscriber base (not shown). In some cases, the headend 19 may convert the signal to a different frequency channel for transmission over the cable; however, the headend 19 will not modify the program signal content. In some embodiments of the invention, the headend 19 will replace the signals appearing in the letterbox bars with new signals representing black bars. For example the headend 19 may replace certain lower modulation signals in those intervals, certain codes that the television station 11 may transmit in those intervals, or signals corrupted by interference by the concurrent users.

The concurrent-use carrier may operate a variety of different types of wireless communication networks on the same or adjacent regions of the spectrum utilized by the broadcast television transmitter 11. In the illustrated example, it is assumed that the concurrent users comprise one or more digital cellular communication service providers. Such providers operate a number of base stations 21. Some of the base stations 21 surround the coverage area 13 of the existing television broadcast transmitter 11. Some of the base stations 21 may be located at or about the edge of the coverage area 13. Preferably, the interference mitigation will allow one or more of the concurrent users to operate base stations 21 even within the coverage area 13 of the broadcast television transmitter antenna.

The concurrent users may operate the base stations 21 to provide a wide range of voice telephone services, Internet access services, paging service, wireless telemetry and control services, image communication services and other data services. One of the exemplary services that the base stations 21 can support includes digital mobile data services.

Such a concurrent use network would enable users of the mobile stations 23 to initiate and receive data communications with each other as well as through the public switched telephone network (PSTN) or packet data networks to land-based computers, Internet servers and the like. Typically, the network includes a number of mobile switching centers (MSCs) or data routers 25, one of which appears in the drawing. Each MSC or data router 25 connects through trunk circuits to a number of the base stations 21, which the MSC or data router controls. Through the MSC or data router 25 and the base stations 21, the network provides data communication services over the common air interface to and from the mobile stations 23. The network elements and the logical communications channels can offer various digital communications services including, for example, digital voice telephony, digital music, Internet and intranet connectivity, paging, telemetry, control, and the conveyance of graphic images and video.

The mobile stations 23, the MSCs or routers 25 and the base stations 21 implement one or more air-link interfaces. For example, the wireless data communications network may support digital radio access methods that can be modified to suit the unique video-referenced keying, timing and power control requirements described herein. Suitable air-link interface techniques can include time division, code division, frequency division, frequency hopping and orthogonal frequency division multiplex. Spread-spectrum emissions are used in the preferred embodiment.

In accord with an embodiment of the invention, the base stations 21 and the mobile user terminals 23 that are within a specified distance of the television broadcast transmitter 11 operate only or substantially only during intervals when that transmitter 11 is broadcasting the bars of the letterbox video format and/or the blanking intervals. In other areas, where there is no television broadcast on the same or adjacent spectrum, the base stations 21 and the mobile user terminals 23 will utilize the acquired spectrum at all times.

Within the area of potential interference, typically close to or within the broadcast coverage area 13, the concurrent users will typically utilize a substantial portion, but not necessarily the entire acquired spectrum. Preferred embodiments will use spread-spectrum emissions and/or those that do not place strong discrete-frequency components (or induced-modulation) near the points most likely to produce interference to the TV sound signal. Simple experiments have been conducted, using a Heath signal generator and television receivers that use typical "intercarrier sound" circuitry. "Intercarrier sound" is a common method of sound-carrier processing in consumer TV and video products. It is known to be sensitive to RF interference because it heterodynes the aural and visual carriers.

The purpose of the experiment was to find the frequencies within a television channel's pass-band (or outside of it) where RF interference causes impairments to reception of the aural (sound) carrier signal. The signal generator was set to produce continuous waves, manually variable in frequency, and at various levels including equal in strength to the television visual carrier being received. Impairment of aural reception was pronounced at three frequencies:

1. Within about 200 kHz of the broadcast aural carrier center frequency, as expected.

2. At 4.5 MHz below the aural carrier, i.e. directly on or within about 200 kHz of the assigned visual carrier licensed center frequency, as expected.

3. At approximately 4.5 MHz above the aural carrier center frequency and within about 200 kHz of that point. This nominal frequency is outside the specific TV channel and appears to be similar to RF artifacts known as "images" which can be calculated in more precise studies.

Knowledge of the above findings will help in practicing this invention while also protecting reception of the broadcast TV sound signal and its subcarriers. This knowledge will also help in choosing the type of RF emission for concurrent RF users to employ.

In NTSC transmission, the chrominance subcarriers is at 3.579545 MHz above the assigned visual carrier frequency. Experiments have shown that the signal and its received color-content modulation are susceptible to RF interference. Concurrent RF users should avoid using strong signals on the chrominance subcarrier frequency during television burst-phase reference intervals, the timing of which is known to be on the "back porch" of horizontal synchronization pulses. Strong signals within the bandwidth of I+Q quadrature signals should also be avoided by concurrent users at times when useful picture content is being transmitted by the television station.

The above experiments should be repeated by the user to assess the received RF interference characteristics for international television broadcast standards such as Phase Alternate Line (PAL), Sequential Color with Memory (SECAM) and others. The various standards employ different scar rates, signal-component frequencies, bandwidths and modulations types. The above findings will help in the practice of this invention in each particular case.

Figure 9A:
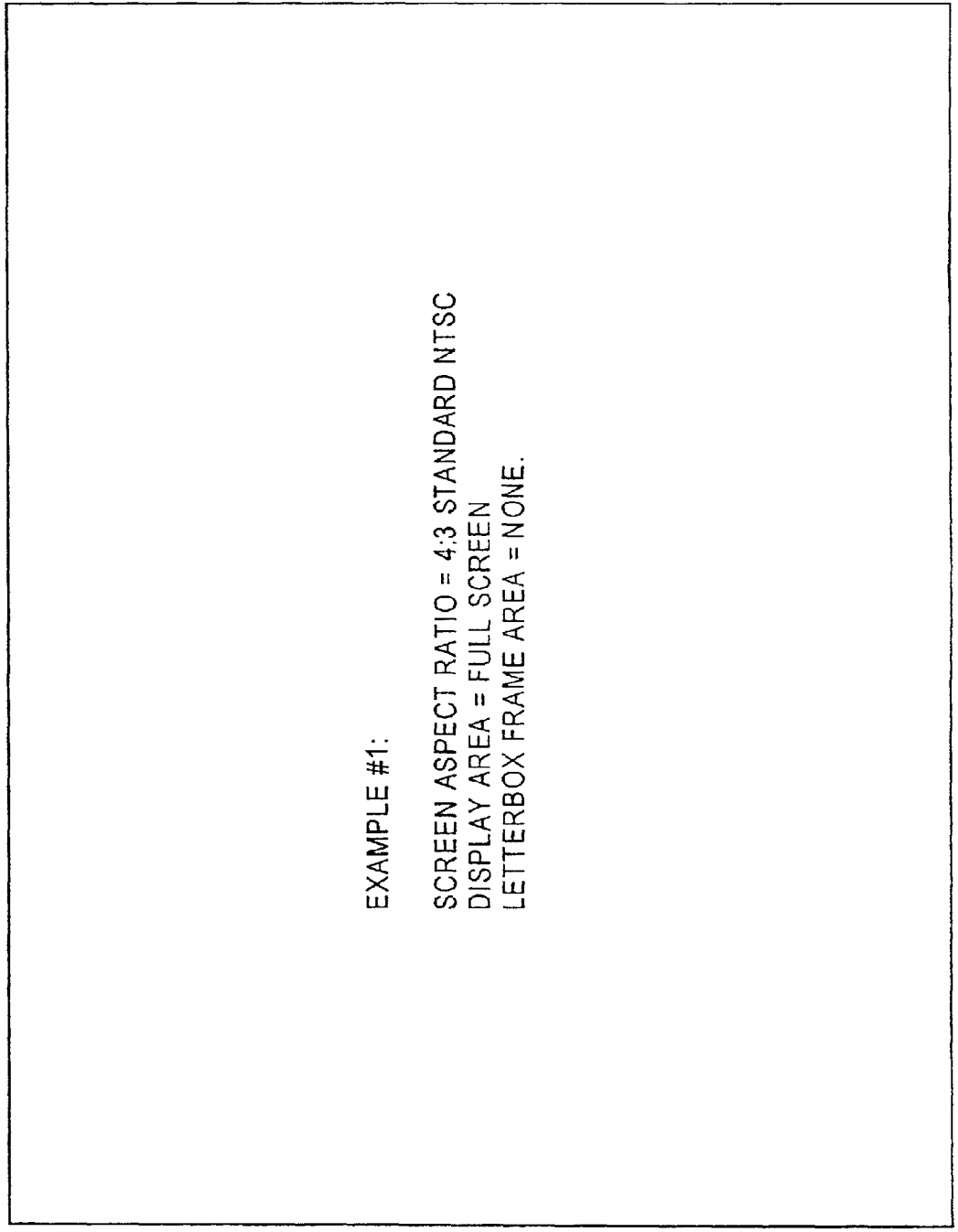

FIG. 9A shows the aspect of a typical television display, as utilized in NTSC type analog receivers. The image fills the entire display screen, and the image has a 4:3 aspect ratio. The image signal consists of interlaced scans of 525 horizontal lines per frame, which are transmitted at a rate of 30 frames per second. If the receiver is properly synchronized to the image signal, substantially all of these lines, except for lines and line segments during synchronization and blanking intervals, will be included in the fill aspect display image on the screen.

Figure 9B:
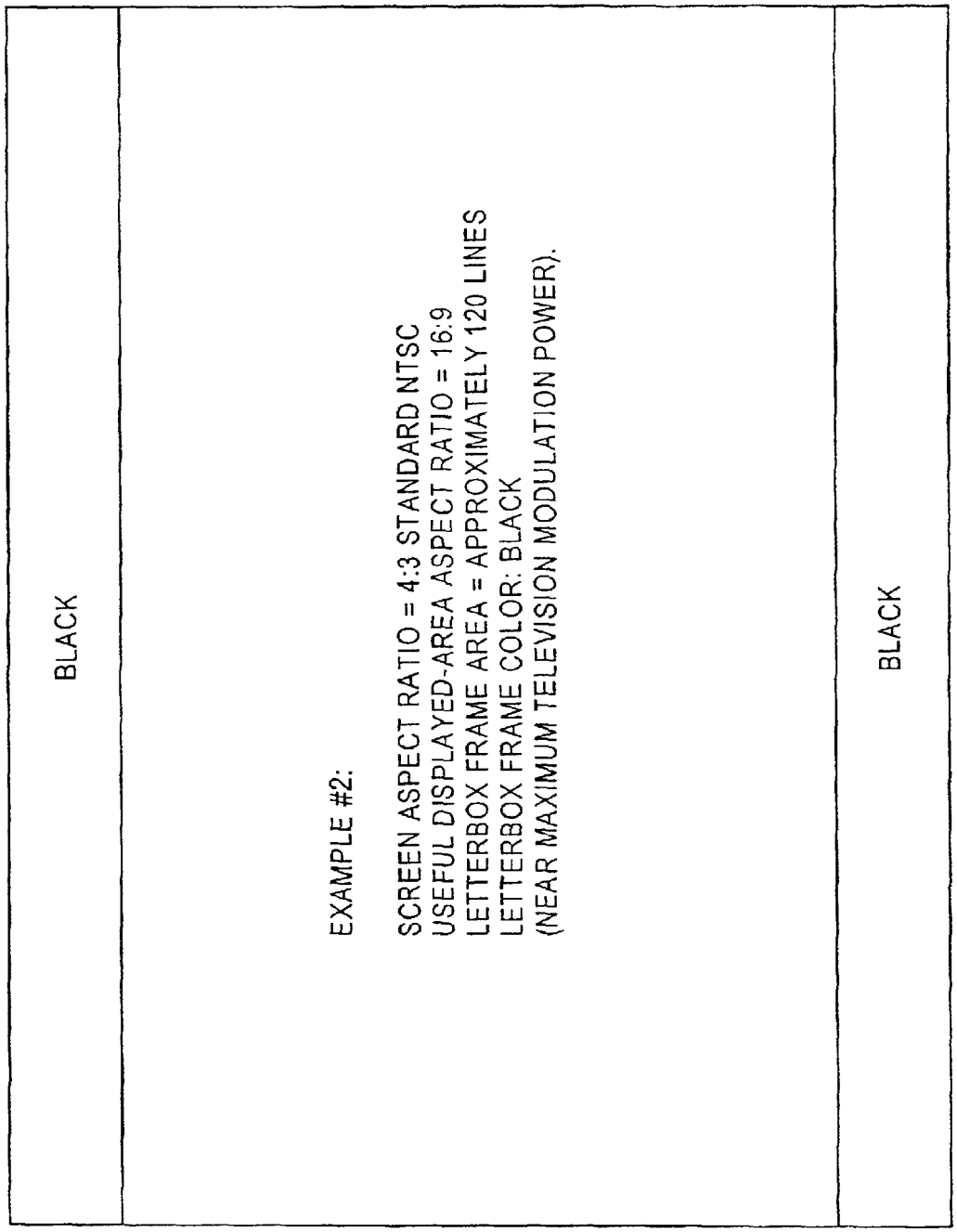

FIG. 9B illustrates one form of letterbox format. Again, the basic video image has a 4:3 aspect ratio. The letterbox format is often used to accommodate the differences in aspect ratios between NTSC or other standard video displays and programs produced in the Advanced Television Systems Committee (ATSC) or other high definition television (HDTV) formats. As shown in FIG. 9B, typical HDTV formats have an aspect ratio of 16:9. When the full width HDTV image is shown on the 4:3 aspect TV screen, the image uses the full width of the screen but not the full height. There are unused regions above and below the actual image. These areas form framing bars. Typically, letterbox borders are seen as horizontal black bars at the top and bottom of the screen. Approximately 120 lines are transmitted as "black" level signal (near maximum modulation power). Sixty of the black image lines appear above the usable HDTV image, and another sixty of the black image lines appear below the usable HDTV image.

Embodiments of the present invention contemplate transmission of other wireless communication signals during the letterbox bar intervals of television broadcast. That is to say, the RF emissions of the simultaneous RF spectrum user are keyed "on" only or substantially only during the time intervals when the letterbox-border video lines are being scanned on the display, i.e. when the potentially affected (interfered with) television display is in the letterboxframe-scanning portions of each video field. The concurrent emission may also be keyed-on during blanking intervals of the TV signal. Appended Table 1 provides a temporal analysis of examples of video and film-to-video image formats and estimates of the transmission time available for other uses (e.g. concurrent wireless usage) of the spectrum assuming implementation of the various letterbox formats.

Temporal analysis of a range of popular letterbox practices and the corresponding video line-times, as shown in Table 1, indicates that nominally 19.20 to 42.66 percent of a television signal's transmission time can be simultaneously used by other RF spectrum users (e.g. for wireless communications). By also keying the concurrent RF spectrum user "on" during certain parts of non-displayed (overscanned) synchronization and/or blanking intervals that are part of every NTSC (or other video standard) field, the above temporal analysis percentages can be marginally increased.

In actual practice, however, there will be some variation in timing due to propagation delays. To insure that such variations do not increase interference problems, it is possible to restrict the concurrent users to the central portions of the bar intervals and blanking intervals, etc., for example by leaving time for several lines at the beginning and end of each letterbox bar during which there will be no concurrent transmissions.

In NTSC television broadcasting in the U.S., for example, the tips of the synchronizing pulses are transmitted at 100 percent modulation (the maximum amplitude modulated power), blanking ("blacker than black") is transmitted at 75 percent modulation, black (e.g. the letterbox lines) is nominally set up at 67.5 percent modulation, and reference white is transmitted at 12.5 percent modulation of the luminance carrier. If still used, the 100 percent, 75 percent and 67.5 percent modulation levels imply good protection for the television signal's carrier-to-interference ratios at the times when concurrent users are keyed "on" per this invention. Further protection is afforded by the fact that the television display will be either black or blanked during these time intervals. However, the high modulation percentages associated with television blanking- and black-levels are at odds with minimizing interference to the concurrent RF spectrum users.

For situations where the concurrent user is in need of greater interference protection from a television broadcast station or stations, further embodiments of this invention offer changes in the characteristics of the letterbox-frame video lines. For example, the letterboxframe lines could be transmitted at a lower modulation percentage, e.g. at or near the white reference level (although this would be visually and practically objectionable if done for prolonged periods).

As noted in the discussion of FIG. 9B, the black bar transmission utilizes near maximum modulation power. To reduce interference with the operations of the concurrent users, the invention contemplates other forms of bars in the transmitted television signal. For example, FIG. 9C shows a white bar type letterbox. The framing is the same as in the letterbox shown in FIG. 9B, but the color used for the bar is white instead of black. The white transmission utilizes near minimum modulation power and pure white is accompanied by a vanishing chrominance subcarrier in NTSC transmission, and as such represents a much lower interference signal for other users. While this might be preferred for the concurrent users, such a low-level modulation in the letterbox bars would often allow the concurrent transmissions to induce visible artifacts into the bars. Embodiments discussed later encompass receiver systems that replace the degraded bars with locally generated black-level signals.

Figure 9D:
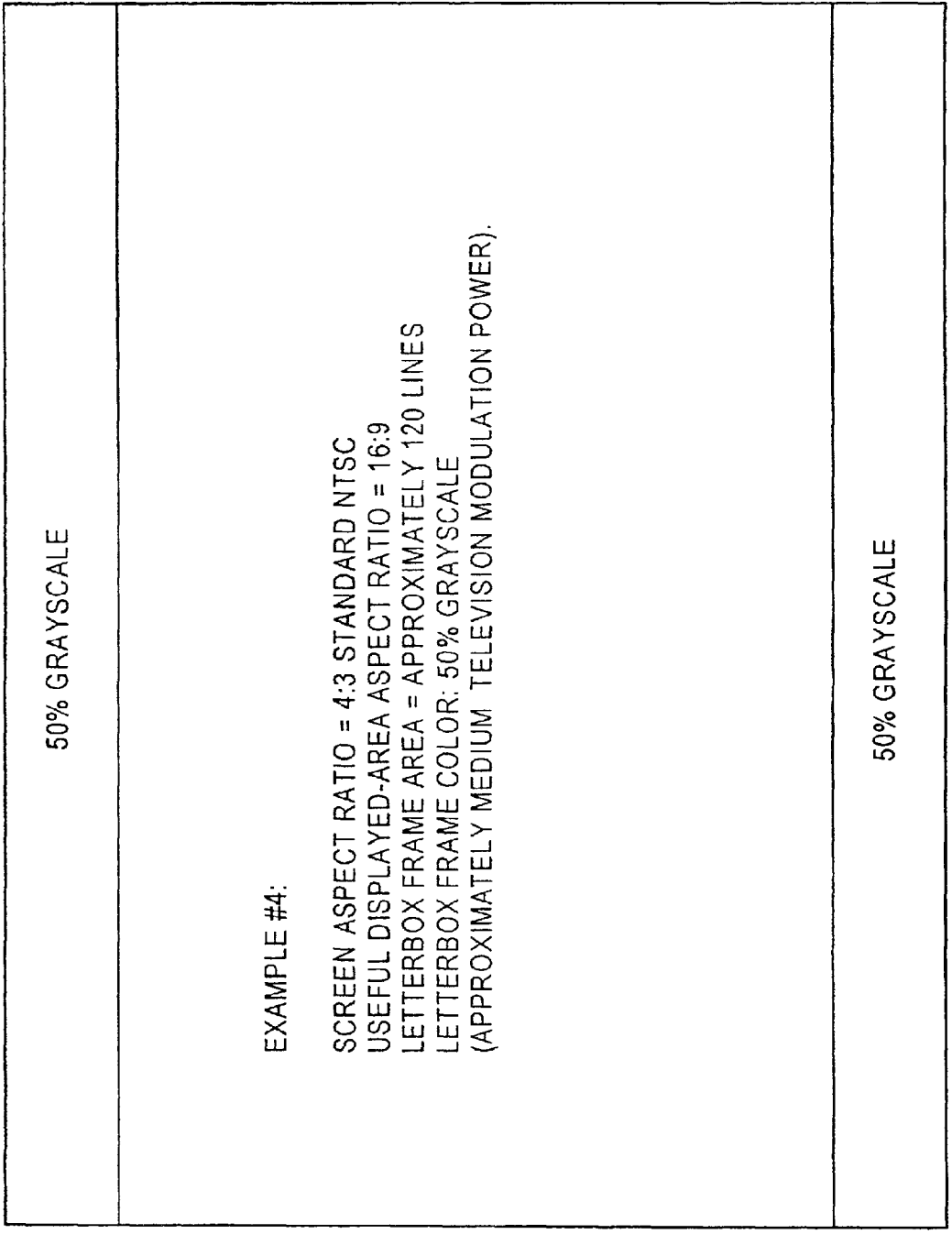
Figure 9E:
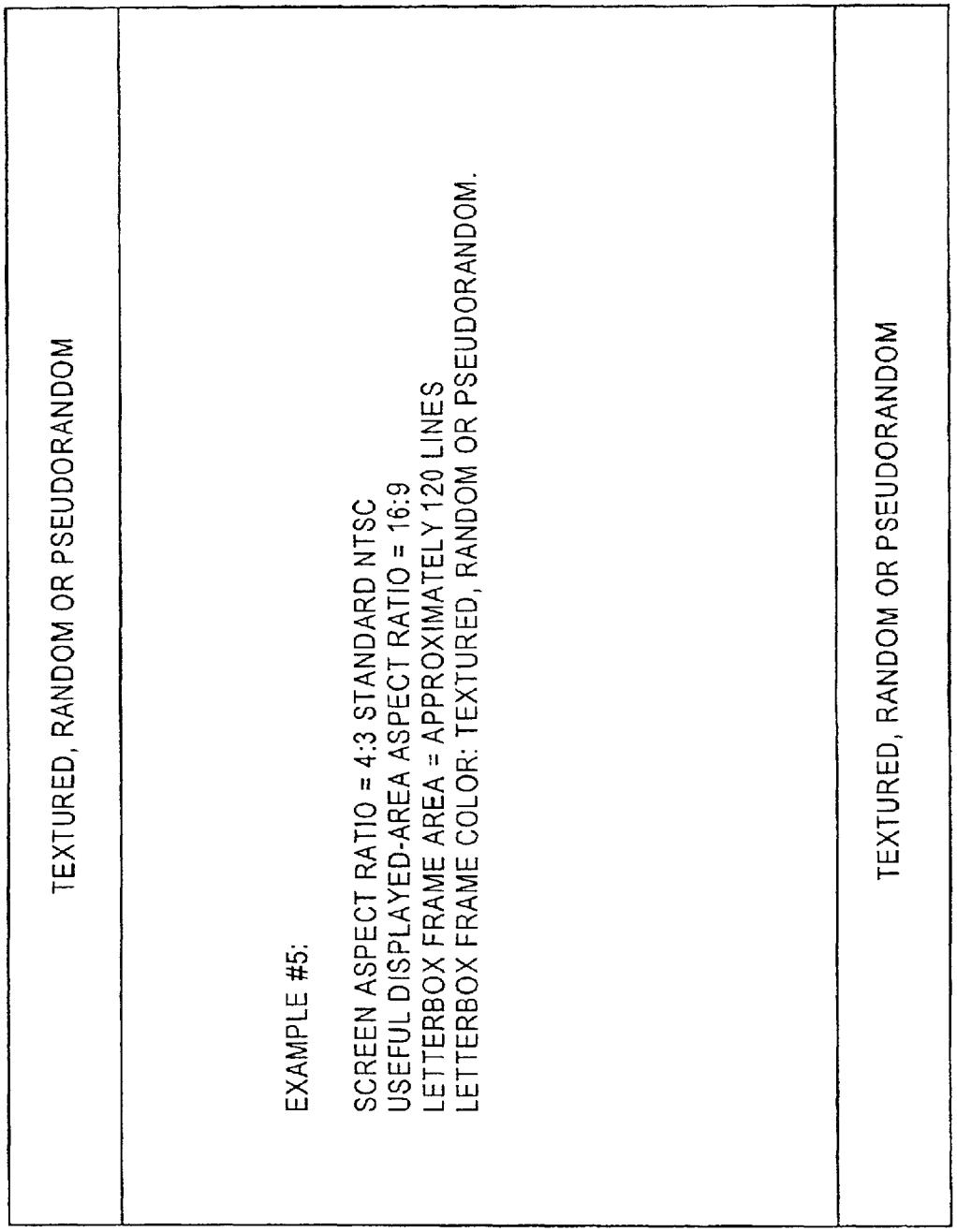
Figure 9F:
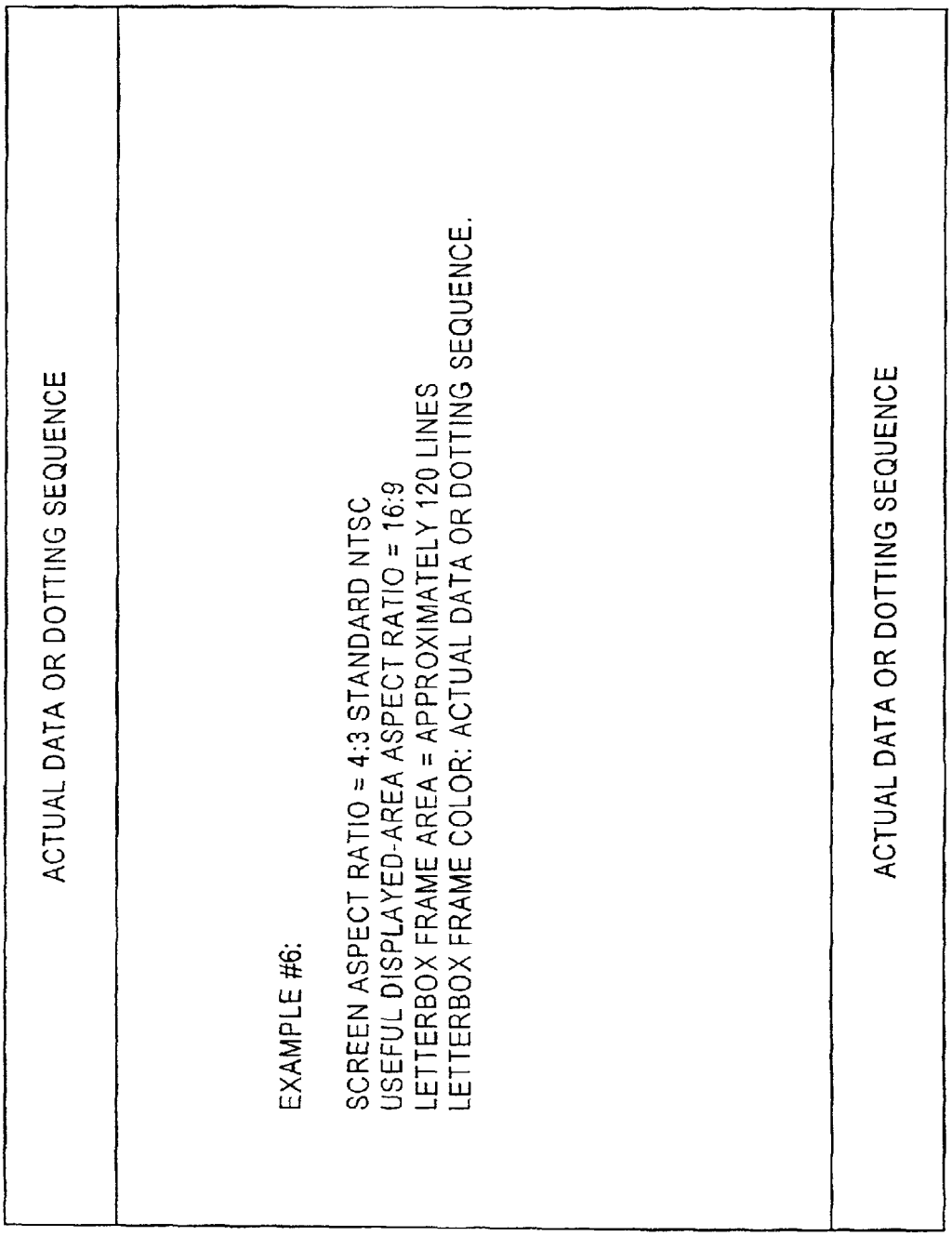

Preferably, other grayscale levels (e.g. nominally 40 percent modulation) would be used in the broadcast transmissions with less visual impact (see e.g. FIG. 9D). Other preferred embodiments of this invention include modulating the letterbox lines in a random fashion (FIG. 9E). Still further embodiments may modulate the letterbox bar signal lines with a code or codes, such as pseudorandom codes, which both obscure the visual impact of the interference to television viewers while intentionally coordinating with and/or inter-working with the concurrent RF spectrum users to minimize the interference to those users (FIG. 9E or FIG. 9F). Another embodiment of this invention enlists the television broadcast station to transmit data during the letterbox-frame video lines that is useful to and/or part of the communications link to the concurrent RF spectrum user. In that mode, the television broadcaster becomes a cooperative part of the communications link (e.g. the downlink) for the concurrent user.

This invention uses existing components of the video signal, as transmitted, as timing references for keying the transmission and/or reception of concurrent users on and off and/or for power- and sensitivity-control decisions during the appropriate time intervals. Preferred embodiments extract timing information alternatively from the video synchronization pulses, chrominance (burst) samples, blanking transitions, triggering based on video particularly black) levels, and by counting video lines from any reference points in the video transmission. In the television broadcast example, concurrent users (e.g. mobile and base communications users) have this timing information readily available to them virtually anywhere because the nature of the broadcast signal is that it is ambient.

In a minimal case, the television broadcaster may not agree to or assist in any way in the operations of the concurrent users except to increase the amount of content presented in letterbox format. However, the inventive concepts encompass embodiments for situations wherein the television broadcaster modifies the program signals to one extent or another to assist in the interference mitigation and thus the enhanced operations by the concurrent users.

Figure 4:
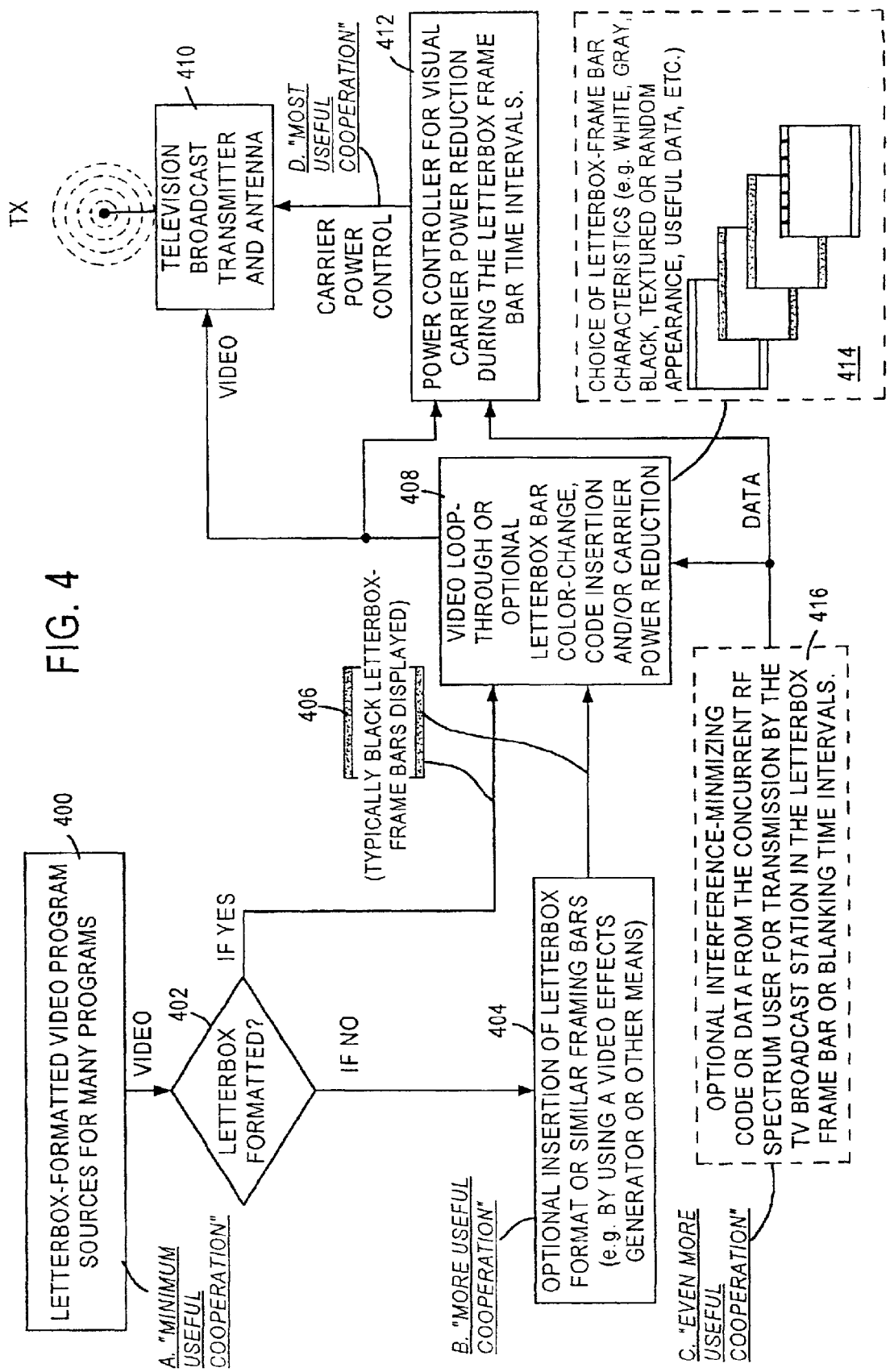
FIG. 4 is a flow-chart of the video signal processing at a broadcast television transmitter in accord with preferred embodiments of the invention.

FIG. 4 is a flow-chart useful in explaining the operations of the television broadcast transmitter system. The system receives letterbox-formatted video 400 for many programs as well as standard NTSC video from a number of sources. A decision is made based on whether or not the received programming is in the letterbox format 402. If not, a preferred option is for the broadcast system to insert letterbox format 404 or similar framing bars, e.g. by using a video effects generator or other means. If the decision 402 indicates the received video is already letterbox-formatted, then this letterbox-formatted video 406 is passed through. The typical letterbox format, from either step 404 or 406, at this point will utilize the standard black letterbox framing bars.

The letterbox video is supplied to a video loop-through or optional letterbox bar colorchange 408, for example to change the color from black to gray. Various, exemplary choices of possible letterbox-frame bar characteristics 414 are illustrated in FIGS. 9A–9F. A further option 416, however, is to modify the framing bars of all letterbox programming such that the signals for the bars include some form interference-minimizing code or data from the concurrent RF spectrum user, for transmission by the TV broadcast station. The code or data is at least included in the central portions of each letterbox frame bar and may be included in some of the blanking time intervals. Examples of the encoding of the frame bars were discussed above relative to FIG. 9E and 9F. In any such case, the letterbox video is supplied to an appropriate code insertion system.

The resulting NTSC signal, with letterbox formatted video, is supplied to a television broadcast transmitter and antenna 410. In the most preferred embodiment, the broadcast service provider will agree to implement power control 412 for visual carrier as well as power reduction during the letterbox frame bar time intervals, to reduce the impact of interference on the concurrent users. Under appropriate control, the transmitter 410 broadcasts the formatted letterbox video signal from the antenna, over the assigned UHF channel into the area of concurrent operations.

Hence, where there is cooperation between the television broadcaster and the concurrent users, the letterbox video broadcast will not conform to current accepted practices. The power level and content of the framing bars, in particular, may be varied from the high power and near-maximum modulation of the black bars used today. However, in view of any established cooperation between the television broadcaster and the concurrent users, the television program users can implement a number of strategies to compensate for the variations in the framing bars.

Figure 5:
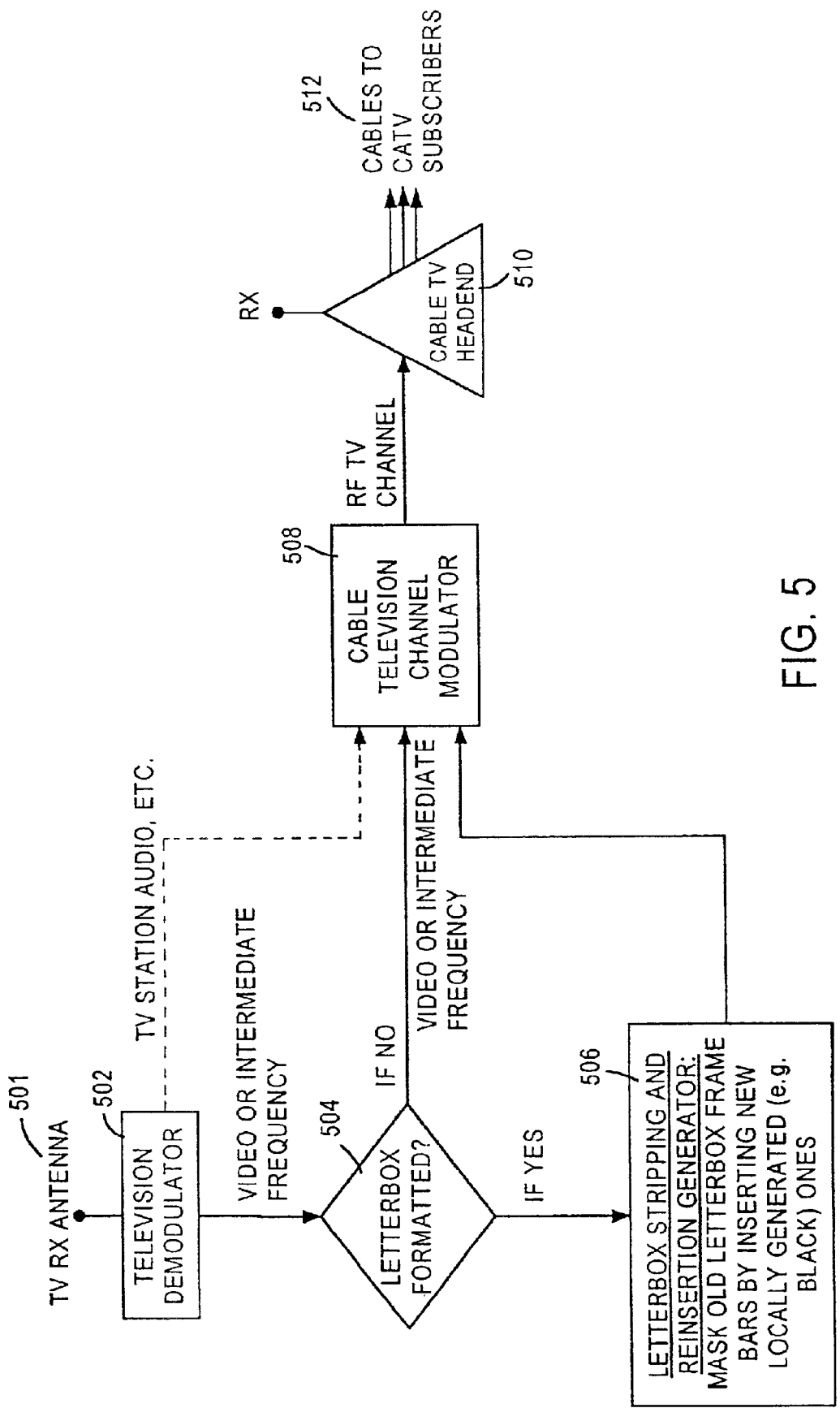
FIG. 5 is a block diagram of a video distribution system implementing certain aspects of the inventive interference mitigation.

FIG. 5 shows a system for processing the broadcast television signal and retransmitting the signal via a cable television network. In the drawing, an antenna 501 receives the UHF broadcast television signal, and a demodulator 502 recovers the baseband video signal. A decision 504 is made based on whether or not the received programming is in the letterbox format. If not, the signal is modulated, by a CATV modulator 508, onto a desired CATV channel and transmitted from the cable TV headend 510 over the coaxial cable network to the cable-system subscribers.

However, if the decision analysis 504 indicates that the received programming is in the letterbox format, then the baseband video signal is supplied to appropriate processing circuitry 506 for letterbox stripping and letterbox reinsertion. As noted above, the broadcaster may opt to transmit the frame bars in any one of several different forms other than the standard black letterbox framing bars. Even if the transmitted letterbox frame bars were black, the bars may be received in a corrupted form. For example, the "old" letterbox frame bars received by the cable television system may have "beat" lines or other interference from concurrent RF spectrum users.

Effectively, a generator 506 masks the old letterbox frame bars from the received signal by inserting new locally generated bars of any desired color and intensity, preferably normal black letterbox frame bars. This eliminates any visual artifacts caused either by the coding or by interference with the bars by the concurrent RF transmissions. The restored letterbox video signal is modulated, by a modulator 508, onto a desired CATV channel and transmitted from the cable TV headend 510 over the coaxial cable network to the cable-system subscribers 512. The cable TV subscribers' television sets receive and display normal letterbox video.

Although shown as a headend implementation in a cable television network, other embodiments encompass similar letterbox bar reinsertion at the television receiver. Those skilled in the art will recognize that it is a simple matter to implement the generator for stipping off the corrupted bars and inserting new black bars in terminal devices, such as television receivers, video cassette recorders, or set-top terminals/descramblers.

Figure 6:
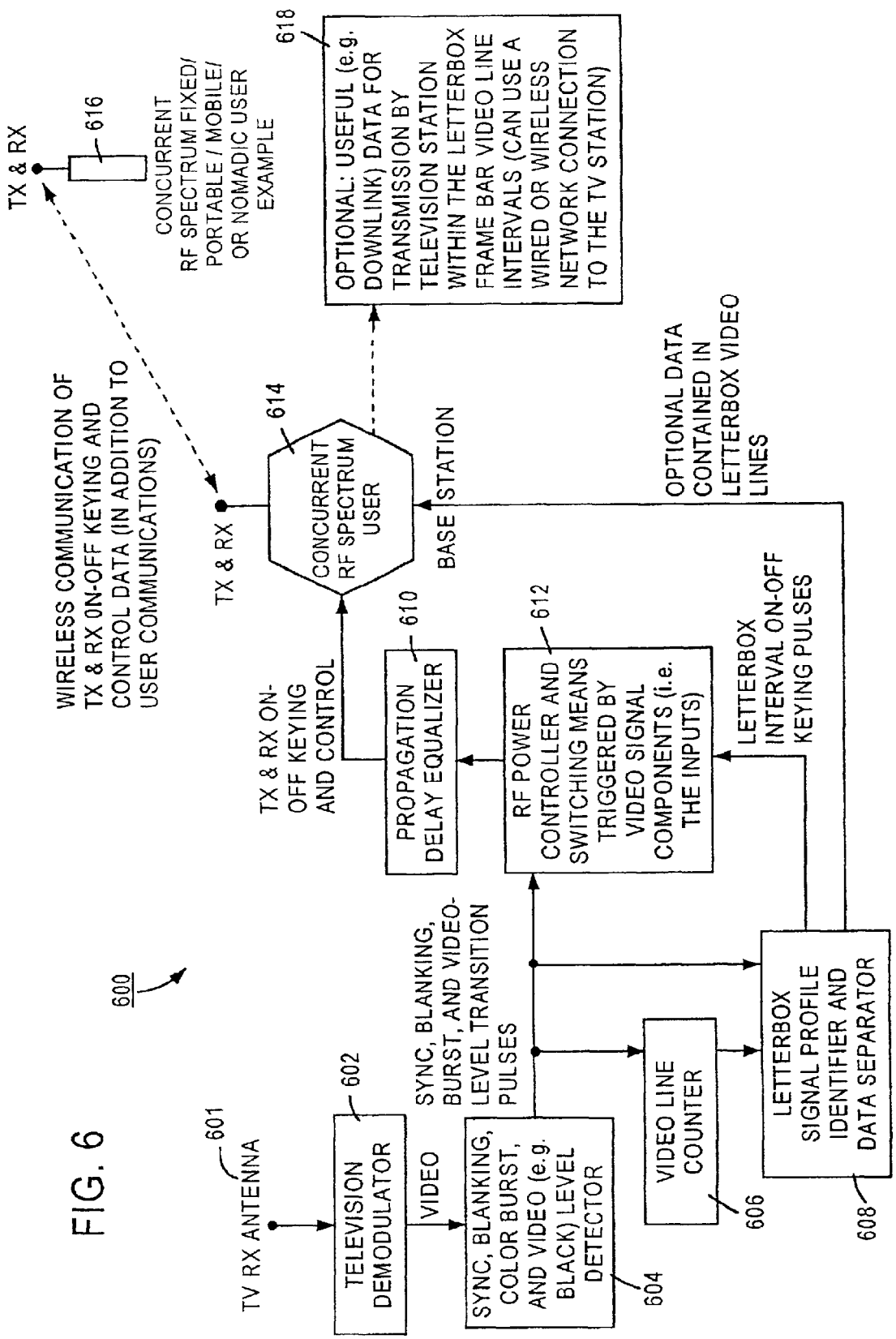
FIG. 6 is a block diagram of a wireless communication system, such as a base station, concurrently utilizing spectrum utilized by the video broadcast system of FIG. 4.

FIG. 6 is a block diagram of a system 600 for implementing the invention in a central system of a concurrent user, such as in association with a wireless base station 614. Through one or more of the antennas 601 associated with the base station, the system 600 will receive the UHF channel television broadcast signal from the transmitter 11. A television signal demodulator 602 will recover the baseband NTSC signal from the received UHF channel signal. A detector system 604 will analyze the baseband television signal to detect the sync, blanking, color burst, and video (e.g. black) levels within that signal. A counter 606 responsive to the detector will count video lines. In response to the count and the detected video level pulses, an identifier 608 will develop a profile of the letterbox signal and separate out any coded data contained in the letterbox frames.

The identifier and data separator 608 will supply timing instructions to an RF power controller/switch 612 to control on-off keying functions. A delay equalizer 610 will adjust the keying sequence signals an appropriate amount to compensate for the propagation delays between the base station 614 and its mobile users 616 and the propagation times between the television broadcast transmitter and any of its television receivers that might be within interference range of the base station 614 and its users 616. Hence, within certain limits caused by propagation differences, the base station 614 will key-on its communication operations only or substantially only during the intervals of the framing bars of the letterbox formatted television broadcast. The keyed state allows the base station 614 of the concurrent user to transmit and/or receive during letterbox frame bar video lines and/or during blanking intervals.

As noted above, one option 608 involves transmission of letterbox framing bars containing coded information. This coding can include data or other information useful to the equipment of the concurrent users in terms of spread-spectrum decoding and attendant interference mitigation. There are two different ways to utilize this information in the wireless domain for the concurrent users. One option involves supplying this information from the video processing system elements to the base station transceiver for retransmission over the wireless air interface to the mobile users terminals. Alternatively, the terminals may recover the coded information directly from reception of the broadcast television signal.

Another useful approach 618 might be to provide certain communications/instructions from the base station to the television broadcaster, for transmission by the television station within the letterbox frame bar video line intervals (can use a wired or wireless network connection to the TV station).

FIGS. 7 and 8 show alternate implementations of the circuitry for the letterbox-related timing control, in accord with the invention, for the mobile user terminals. In the embodiment of FIG. 7, it is assumed that the mobile terminal unit includes its own letterbox-video processing circuitry to control timing of the terminal operations directly from the broadcast television signal. Hence, the embodiment of FIG. 7 is much like the base station embodiment discussed above relative to FIG. 6.

With reference to FIG. 7, the circuitry associated with the remote terminal of the concurrent user will receive the UHF channel television broadcast signal from the transmitter 11 through an antenna 701. A television signal demodulator 702 will recover the baseband NTSC signal from the received UHF channel signal. A detector system 704 will analyze the baseband television signal to detect the sync, blanking, color burst, and video (e.g. black) levels within that signal. A counter 706 responsive to the detector will count video lines. In response to the count and the detected video level pulses, an identifier 708 will develop a profile of the letterbox signal and separate out any coded data contained in the letterbox frames.

The identifier and data separator 708 will supply timing instructions to an RF power controller/switch 712 to control on-off keying functions. A delay equalizer 710 will adjust the keying sequence signals an appropriate amount to compensate for the various differences in propagation delays between the broadcast signal and the concurrent RF transmissions. Hence, within certain limits caused by propagation differences, the mobile user's terminal device 714 will key-on its transceiver operations only or substantially only during the intervals of the framing bars of the letterbox formatted television broadcast and/or certain blanking intervals of the TV signal.

The embodiment of FIG. 8 assumes that the remote terminal station 806 does not process the broadcast television signal, directly. Instead, this embodiment relies on signals transmitted from the base station (for example, 614 of FIG. 6). In this embodiment, an RF power controller 802 receives timing instructions as part of the transmission signals from the base station. The terminal may also include a data separator 804 to recover any associated control data transmissions. Responsive to the power control signals, and/or in response to any recovered data, the mobile user's terminal device 806 will key-on its transceiver operations only or substantially only during the intervals of the framing bars of the letterbox formatted television broadcast and/or during TV signal blanking intervals. The keyed state allows the mobile terminal unit to transmit and/or receive during letterbox frame bar video lines and/or during the blanking intervals.

Wide acceptance of the inventive interference mitigation techniques is facilitated by the fact that television stations already transmit part of their programming in letterbox formats. This is increasingly due to programs being produced in HDTV that need to be sent in the NTSC (or other standard) mode, film-based movies being broadcast in widescreen format, or simply for the graphic effects that letterbox formats afford. The concurrent user should be able to negotiate an agreement with the existing TV broadcaster, at least to increase the broadcast of letterbox video.

Using this invention, concurrent RF spectrum users can operate spectrally closer to the TV channel video carrier and physically closer to the TV broadcast transmitter, TV receivers, and cable TV headends without objectionable interference to TV viewers. In addition, cable TV viewers protected by an embodiment of this invention will not see any interference or station-transmitted modulation of (or changes in) the letterbox frame bars, which will appear to be perfect (e.g., purely black). The invention also mitigates interference to concurrent spectrum users and creates new cooperative means that allow the practical use of encumbered spectrum over greater areas.

While the operation and logical organization of the invention has been described with respect to FIGS. 1–9, FIGS. 10–14 illustrate exemplary hardware that operates to allow RF spectrum users to concurrently use portions of the spectrum with television broadcasts that have geographical and/or spectral proximity to the concurrent user. More particularly, the concurrent use of the spectrum is performed so as to mitigate, to varying degrees, both interference caused by the concurrent user as well as interference caused by the television broadcast signal. The illustrated equipment configurations are exemplary in nature and are not intended to limit the scope of the present invention as recited in the appended claims.

Figure 10:
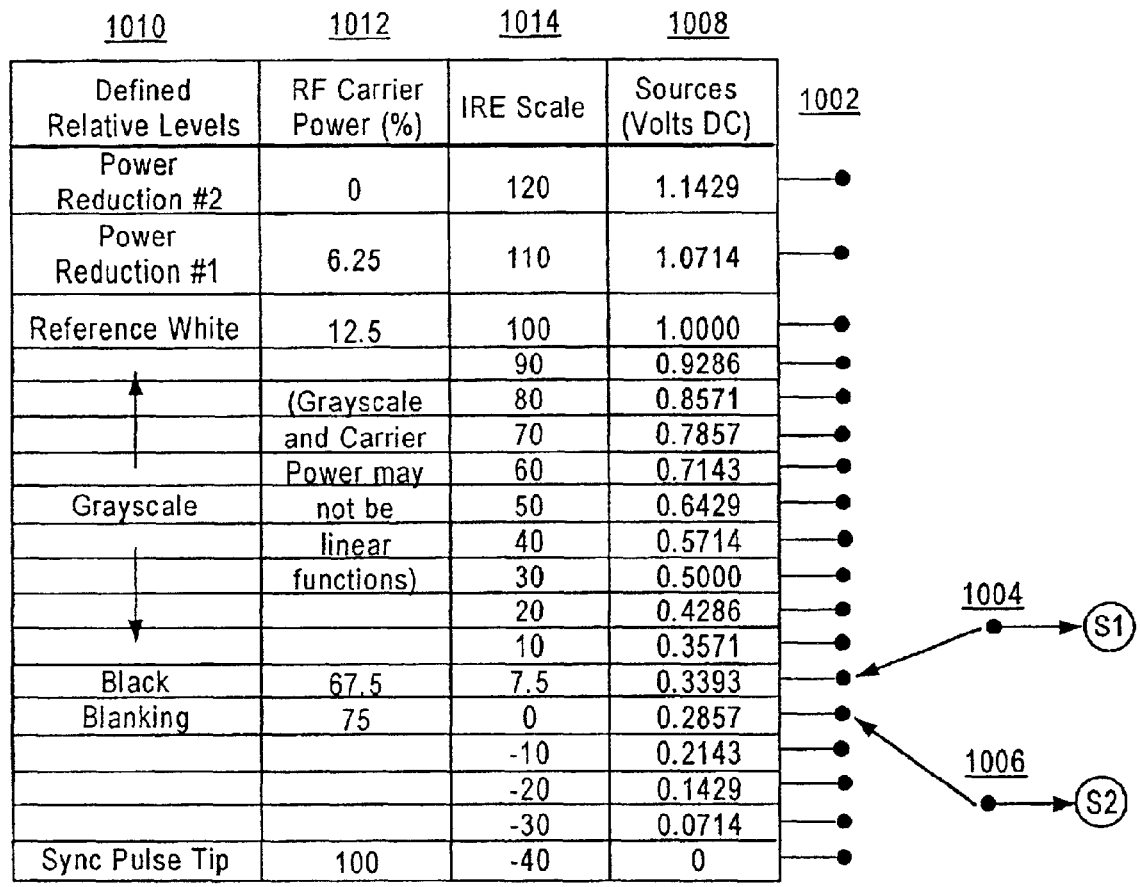
FIG. 10 illustrates a plurality of voltage sources for providing reference voltage levels.

A bank of switch connections 1002 are depicted in FIG. 10 that can be connected to the switches 1004 and 1006. The switches 1004 and 1006 can be mechanical switches or, more generally, independently assignable electrical connections to any of the connection points 1002. Each of the connection points 1002 are coupled with reference voltage sources, the levels of which are depicted numerically in the column 1008, so that a reference voltage level is provided to a switch 1004 or 1006 that is connected thereto.

The left-most columns 1010, 1012 and 1014 illustrate various conventional television m signal characteristics that are typically associated with the different voltage levels of column 1008.

Figure 11:
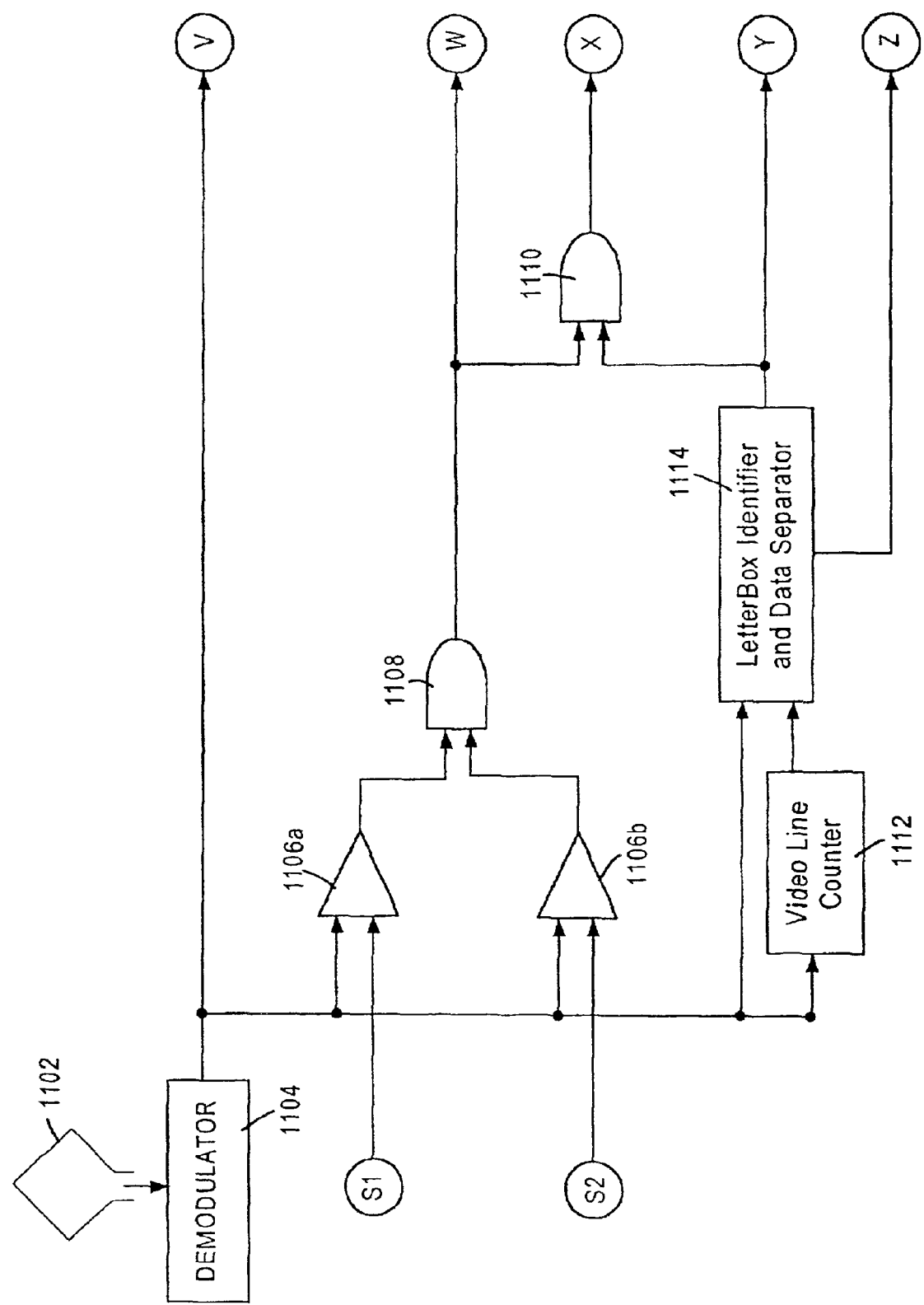
FIG. 11 illustrates control circuitry that generates control signals according to a video signal according to an embodiment of the invention.

The signals S1 and S2, from the switches 1004 and 1006 provide an appropriate voltage reference level to the circuitry depicted in FIG. 11, according to whichever respective voltage source the particular switch is connected with.

The logic circuitry depicted in FIG. 11 provides a number of signals used in transmitters and receivers of concurrent users. In particular, these signals include transmitter on/off timing signals, duration signals and control signals; receiver on/off timing signals, duration signals and control signals; transmitter power level control signals; and receiver sensitivity control signals. The occurrence and value of these signals are based on one or more of the following: 1) the presence (or absence) of letterbox-formatted video lines, 2) any data contained within the letterbox-formatted video lines, 3) luminance and/or chrominance modulation, and 4) other characteristics of the complete video signal, including horizontal and vertical synchronization pulses, horizontal and vertical equalizing pulses, color subcarrier and burst phase, blanking, or active video as transmitted by the television broadcast station. As described herein, both the selection and use of appropriate timing and control signals play a role in addressing the specific communication challenges and interference mitigation problems faced by a concurrent RF spectrum user. These control signals can also be used in other instances such as controlling aspects of cooperating television stations (see FIG. 4) and facilitating the cooperation of cable television stations (see FIG. 5).

FIG. 11 shows exemplary control circuitry for generating the different control and timing signals useful in different embodiments of the present invention. In addition, other functionally equivalent signal generation methods are contemplated within the invention's scope. The logic circuitry depicted in FIG. 11 helps illustrate the different signals that can be derived to mitigate interference between a concurrent user and a television broadcast, as well as how these signals can be used to perform such interference mitigation. One skilled in the art will recognize that other types of circuitry and programmable signal processors can also be used to produce the types of signals shown in FIG. 11.

In FIG. 11, a television antenna 1102 feeds a received television broadcast to a demodulator 1104. The demodulator 1104 is similar in function to the television demodulators depicted in FIGS. 5–7 and generates a composite baseband video signal V from the received television broadcast. This video signal preferably conforms to the Institute of Radio Engineers (IRE) video scale which can range from 0 to 1 volt (peak-to-peak) or optionally from 0 to 1.1429 volts (peak-to-peak). Comparators 1106a and 1106b compare the video signal V with the voltage reference signals S1 and S2 and provide intermediate output signals to the logic gates 1108 and 1110. The video signal V is transmitted along a parallel path to a video line counter 1112 and a television signal analyzer 1114. Based on the outputs of the logic gates 1108 and 1110 and the analyzer 1114, the control signals W, X, Y and Z are generated and output.

The output signal V is a pass-through of the baseband composite video signal V from the television demodulator 1104. Preferably, the video output stage of the demodulator 1104 includes driver circuitry with sufficient current-sourcing capability to serve as a video current source for the circuitry depicted in FIGS. 11–14.

The output signal W is a binary logic level that indicates whether the video signal V is or is not within a user-selected video voltage range at any instant. The depicted, exemplary method of generating the signal W uses the video signal V, the signals S1 and S2, two comparators 1106a and 1106b, and an AND gate 1108. In this exemplary method, the slew rate of the comparators 1106a and 1106b and the logic gate 1108 must be sufficiently fast to track the transitions of the composite video signal V. As a general principle, the speed characteristics of all the electrical and electronic devices used in implementing the present invention should be sufficient to switch during a desired interval such as small fractions of video line time. Device fan-out characteristics (e.g., current driving capabilities) should also be sufficient to allow the devices to function as current sources for the circuitry depicted in FIGS. 11–14.

The comparator 1106a is configured such that when the voltage level of the video signal V is less than the chosen DC reference voltage at S1, the logical output of the comparator 1106a switches to a high state. In the example depicted in FIGS. 10 and 11, the signal S1 provides a reference voltage of 0.3393 V.

The comparator 1106b is configured as non-inverting such that when the voltage level of the video signal V exceeds the chosen DC reference voltage at S2, the logical output of the comparator 1106b switches to a high state. Conversely, when the voltage level of the video signal V is less than the DC reference voltage at S2, the logical output of the comparator 1106b switches to a low state. In the example depicted in FIGS. 10 and 11, the signal S2 provides a reference voltage of 0.2857 V.

The outputs of the comparators 1006a and 1106b serve as inputs to the AND gate 1108. Accordingly, the output of the AND gate 1108 is high only when both comparator outputs are high. In the depicted example, therefore, the output signal W is high when the voltage level of the video signal V, at an instant, is within the selected S2-to-S1 reference voltage range (e.g., between 0.2857 and 0.3393 V, inclusive).

The typical meanings associated with different video signal voltage levels are listed in the left-most column 1010 of the table in FIG. 10. The video "blanking" level corresponds to 75% television transmitter modulation and zero IRE on the video scale and is represented by a reference voltage of 0.2857 V. Video "black" level corresponds to 67.5% modulation and 7.5 IRE and is represented by a reference voltage of 0.3393 V. The exemplary control circuitry in FIG. 11 with signals S1 and S2 set as shown, can be described as activating output signal W only when the corresponding video signal W is at a "black" or "blanking" level, or at any level in-between.

The contact positions for switches 1004 and 1006 can be changed in order to produce a high logic state at output W upon the occurrence of video signal levels within a number of desired voltage ranges. In the most general terms, then, the output signal W will be in a logichigh state when the composite video signal V is between the voltage reference S2 and the voltage reference S1, inclusive and at a logic-low state otherwise. As shown herein, the output signal W can be used to key on and off concurrent users' transmitters and receivers during selected periods of the video signal V. With the S1 and S2 settings shown in FIGS. 10 and 11, concurrent communication is allowed only during black-to-blanking portions of the video signal V, thus limiting concurrent RF spectrum user operation to black video lines and/or blanking intervals as a mode of mitigating interference with television broadcast reception.

Other alternative modes include connecting the switches 1004 and 1006 with the 0.9286 V contact and the 1.0 V contact, respectively. Under these conditions, the output signal W would be in a logic-high state at white intervals, including "reference white". As such, concurrent RF user transmission and reception would be allowed during high luminance, low television transmitter modulation portions of the television broadcast transmission. Concurrent RF spectrum user operation during high-luminance video lines is one possible mode to mitigate television broadcast interference to concurrent RF spectrum users. Other possible alternatives include choosing S1 and S2 settings at reference voltages throughout the range shown in FIG. 10 to allow concurrent RF spectrum user operation at any desired parts of the video grayscale or during any parts of the composite television signal.

Figure 12:
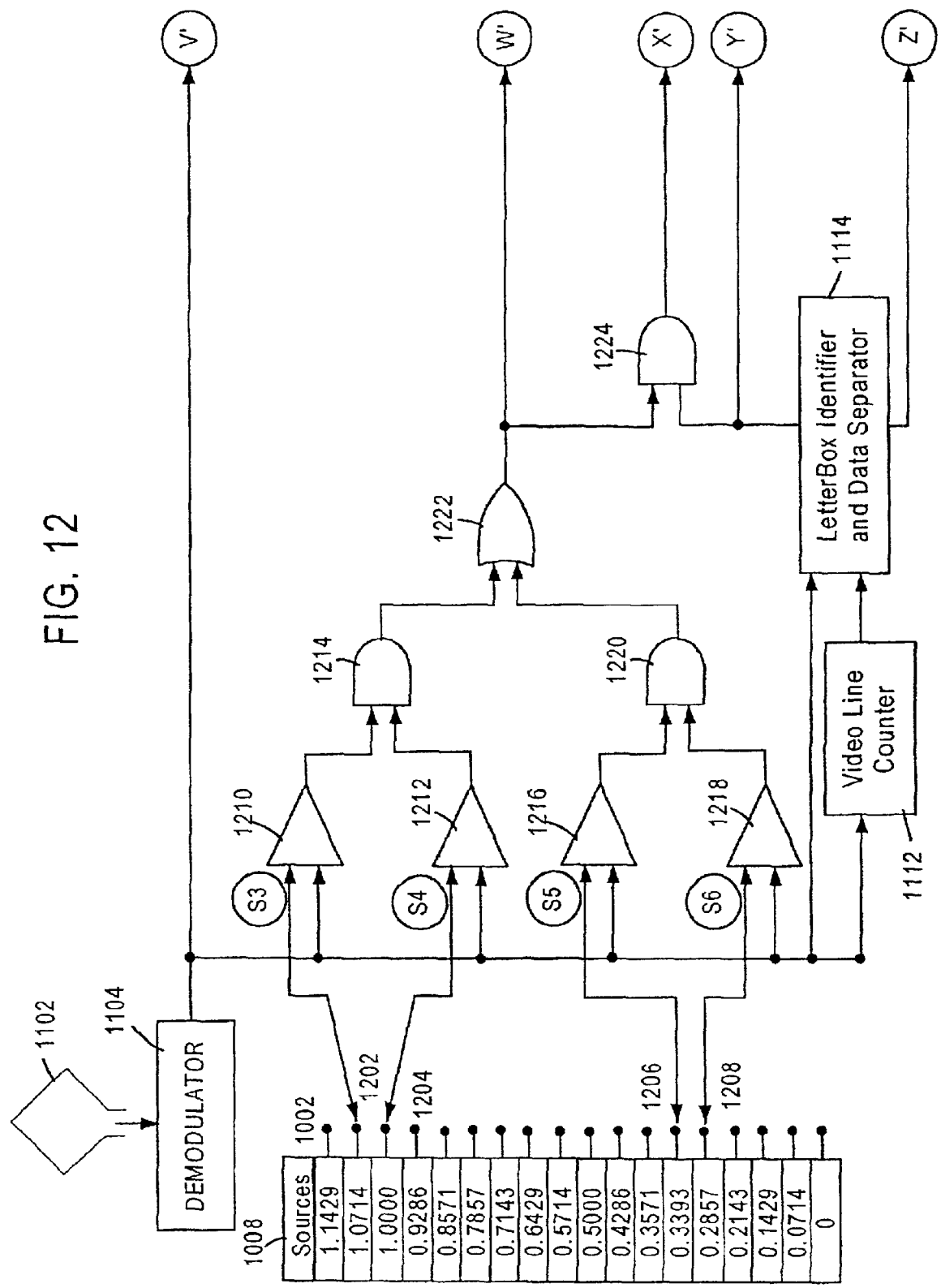
FIG. 12 illustrates control circuitry that generates control signals according to a video signal according to another embodiment of the invention.

Another embodiment of the present invention allows concurrent t RF spectrum user operation during more than one range of video signal voltage levels. The exemplary circuitry depicted in FIG. 12 enables the occurrence of a voltage level of a video signal V' within two different, distinct voltage ranges to produce a logic-high state on output signal W'. The additional circuitry introduced in FIG. 12, described in more detail later, can also be replicated multiple times to allow concurrent RF spectrum user operation in even more than two portions of the television broadcast transmission. The connections 1002 to the various voltage reference sources are provided to multiple switches 1202–1208. The switches 1202–1208 are configured into a first pair of switches 1202 and 1204 and a second pair of switches 1206 and 1208. Similar to the switches 1004 and 1006 of FIG. 10, each switch 1202–1208 is connected to a voltage reference connection to produce the signals S3–S6. Each pair of switches is connected with two comparators and an AND gate, similar to the circuit configuration described in relation to FIG. 11. Specifically, the switches 1202 and 1204 are coupled with comparators 1210 and 1212 whose outputs are provided to the AND gate 1214, and switches 1206 and 1208 are coupled with comparators 1216 and 1218 whose outputs are provided to the AND gate 1220. In operation, the output of the AND gate 1214 is at a logic-high state only when the voltage level of the video signal V' is between the voltage reference levels S4 and S3, inclusive. Also, the output of the AND gate 1220 is at a logic-high state only when the voltage level of the video signal V' is between the voltage reference levels S6 and S5, inclusive. The outputs of the AND gates 1214 and 1220 are provided to an OR gate 1222 such that the OR gate's output signal W' is at a logic-high state when either outputs of the AND gates 1214 and 1220 are at a logic-high state. :Thus, the circuitry of FIG. 12 produce an output signal W' that is activated when a voltage level of the video signal V' is in-between either one of two distinct voltage level ranges. As shown in FIG. 12, the two different voltage ranges are not required to be continuous.

By enabling concurrent user transmission and reception during more than one alternative, non-continuous video IRE range, different interference protection strategies can be implemented according to the concurrent RF spectrum user's geographic location or circumstances. For example, the operation of a user near a highly populated area (with many television viewers and, possibly, unprotected cable television head-ends), may place mitigation of the viewer's interference as the paramount criterion for operation. In that instance, concurrent user operation only during blanking or black video elements may be desired even though the user data throughput, as a result, will possibly be reduced because of the restricted "on" intervals available and the increased possibility of RF interference from the television signals.

Conversely, when a concurrent user is in a rural area with few direct-reception television Viewers and no unprotected cable television headend nearby, interference protection for the concurrent user can be given the highest priority. Furthermore, irrespective of location, if the concurrent user's communication is associated with an emergency, that communication can have a priority level associated with it. A high priority communication would be able to be received or transmitted at additional parts of the video IRE scale to ensure the communication's completion as quickly as possible. Thus, the concurrent RF spectrum user operation during the black-to-blanking portions can be supplemented to allow operation during white, gray or all composite video elements.

The location-determinable and priority-determinable selection of permissible RF interference levels and the determination of which entity, the television viewer or the concurrent RF user, is given the greatest protection can be automatically or manually selected. Automatic methods for location-determined priority of communications include having a global positioning system (GPS) receiver or other location determining apparatus serving the concurrent user and correlating the interference protection modes with the user's location. Additionally, automatic methods for emergency-determined priority of communications include invoking a mode that provides the best RF interference protection for the concurrent user upon the use of a defined emergency code (e.g., 9-1-1) or upon otherwise sensing an emergency event or alarm condition. High priority modes could also be invoked by a concurrent user during periods of high communications traffic demand.

Reference white (i.e., 12.5% television transmitter modulation) and other highluminance levels are transmitted using comparatively low vestigial sideband (VSB) amplitude modulation of the television transmitter and typically will produce less interference to concurrent RF spectrum users than will black, blanking and synchronization levels that use higher VSB modulation percentages. The present invention includes embodiments that use unconventional video levels that are whiter-than-white to reduce the modulation percentage even further in order to maximize the protection of concurrent RF spectrum users. In these embodiments, cooperating television broadcast stations would agree to transmit portions of a television broadcast at these modulation percentages and concurrent RF spectrum users would set their equipment to operate during these portions. Referring back to FIG. 10, a user may select from among the top three voltage reference levels to allow concurrent receive and transmit operations, for example, in a first (12.5-6.25% modulation) or second (6.25-0% modulation) power reduction mode.

In operation, cooperating television broadcast stations would not continuously transmit in the ranges of 0% to 12.5% modulation for the full duration of a video line or lines. Preferably, in this cooperative embodiment, the high-luminance modes are used as part of a useful data stream or dotting sequence that is transmitted by alternating between high and low, or multiple, luminance levels. The benefit of these low-modulation-percentage segments can be further increased by making them synchronous or pre-defined and, thus, predictable to the concurrent user. Pseudo random-and/or orthogonal codes are exemplary methods to accomplish such predictability. In addition to the utility of such a data stream, the time interval over which this stream is sent offers the greatest interference protection to the concurrent RF spectrum users.

Additional refinements can be implemented when more than one television broadcast station cooperates in transmitting-their respective signal. Such stations can reside in adjacent or overlapping coverage areas that pose an additive ambient interference or receiver overload problem for concurrent RF spectrum users. In the cooperative environment, the respective data streams transmitted by each cooperating television broadcast station can be coordinated and time-synchronized among the stations to ensure that the highest-luminance (i.e., lowest modulation) parts of the data streams and/or dotting sequences from each station are substantially coincident in timing. The net effect will be periods of minimum interference, during the coincident, high-luminance periods, for concurrent RF spectrum users in the frequency bands used by the cooperating television broadcast stations. Other alternatives can include ensuring that the lowest luminance (i.e., highest modulation), most repeated, or continuous portions of each transmission are not time-coincident among the cooperating television broadcast stations. Examples of such periods include synchronization pulses, blanking intervals, and black letter-box lines. Benefits from the described cooperating environment do not require every television broadcast to cooperate but can be realized with just a few cooperating broadcasters.

Returning to FIG. 11, output signal Y is a binary logic level indicating the instantaneous absence or presence of letterbox-formatted video lines. The logic state of signal Y is high when a video line is found to be part of a letterbox bar and, otherwise, is low. Preferably, the signal analyzer 1114 is programmable circuitry realized in hardware, software or a combination. The signal analyzer 1114 is programmed to indicate that letterbox formatting exists by outputting a Lo high logic sate during the letterbox bar scanning time intervals. The signal analyzer 1114 analyzes the line-by-line video signal V and sequential video field contents to determine whether letterbox bars, which are typically black, are present. Additionally, by appropriate programming, the video signal analyzer 1114 can be programmed to produce a logic-high state upon detecting letterbox bars of any desired definition to allow the presence of content such as other luminance levels, color, text, a broadcast station's graphic insignia, or other video, data and/or dotting sequence to fall within the letterbox bar definition. Furthermore, the logic-high state can even be programmed to occur during synchronization, blanking and other intervals while being prevented during specific video lines such as vertical intervals or closed-captioning data.

The term "letterbox bar" as used herein is intended to include more than simply conventional letterbox bars. A television broadcast can include a picture portion and a separate, non-picture portion. As used herein, letterbox bars encompass this non-picture portion of the television broadcast, in all of its possible and various implementations. Such usage includes the use of letterbox or other bars or borders, inserted or naturally occurring picture elements of any type, elements of various sizes and shapes, regardless of where placed, and including the use of whole or fractional segments of a video line. Examples include letterbox (and variants) using inserts at the top, bottom, left, right, or through an image or picture portion of the television broadcast, whether angular or curved with respect to the image, or surrounding the image, or within the image, or surrounded by the image, or inset in any manner. These letterbox bars, or other elements, can be identified whether or not they are done purposely for the benefit of, or in cooperation with, concurrent RF spectrum users.

To facilitate the determination by the video signal analyzer 1114 of whether or not letterbox bars are present, a video line counter 1112 assigns numbers to the video lines in each respective video field of video signal V. The video signal analyzer 1114 identifies video content that resembles the defined characteristics of a letterbox bar and associates with the content an appropriate video line number provided by the line counter 1112. A decision algorithm of the signal analyzer 1114 determines whether the video content and placement fit any of the programmed definitions for letterbox bars. As a general rule, letterbox bars are black and characterized by zero or low video level change along a line which are relatively easy to detect electronically. Also, letterbox bars are typically clusters within the video fields to produce visible bars, equal in size, one at the top and one at the bottom of the video display. Variations exists in which, for example, bars are unequal in size or adjacently positioned anywhere within the display and can include video, graphics or text. The decision algorithm of the video signal analyzer 1114 can be programmed to include all the desired letterbox bar definitions so that the output signal Y is activated during the occurrence of any "formatting" portion of the television broadcast.

Where sequential and clustered groupings for video lines are used to form the letterbox bars, the output signal Y can optionally remain in a logic-high state continuously throughout the relevant sequence of lines within each video field. As a result, the intervals containing synchronization pulses and blanking, as well as video line time, can be optionally included in the letterbox intervals in certain embodiments of the present invention.

The output signal Y can also be used by cooperating television broadcast stations as shown in the "power controller for visual carrier power reduction during the letterbox bar time interval" feature illustrated in FIG. 4. In this embodiment, a television broadcast station transmitted RF power can be reduced during the letterbox bar time intervals in synchronization with (e.g. logically responsive in timing and duration to) the logic state of the output signal Y. In this particular instance, the signal Y is preferably defined as being in a logic-high state (i.e., enabling television power-reduction) only during the video lines that comprises the visible portions of the letter box bars and optionally during parts of the blanking interval, but not during synchronization and vertical interval reference signals. The television power reduction based on the logic state of the signal Y is different from the reductions in modulation percentage previously described. Rather than reducing the modulation percentage, the logic state of the output signal Y can be used to control the reduction of any continuous wave, modulated, or unbalanced VSB induced carrier power output of a television broadcast transmitter during the letterbox bar intervals. This "Power Reduction #3" mode could be performed, for example, by a cooperating television broadcast station in order to offer increased interference protection to concurrent RF spectrum users.

The amount of any change in said power would generally need to be less than six dB and/or timed as described herein so as not to cause objectionable impacts to television reception due to the induced (e.g. continuously counteracting) responses of automatic gain control and/or intercarrier sound circuitry (and the like) typically found in television receivers. However, the design of many receivers will allow them to be less affected than others. In one exemplary embodiment of the "Power Reduction #3", the change in power is limited to the video lines that comprise the letterbox bars, is not done during the synchronization pulses, and does not affect the received strength of synchronization-pulse power at the television receiver. This embodiment thereby takes maximum advantage of the relative immunity offered by "keyed" automatic gain control circuitry (i.e. automatic gain control circuitry that samples the received signal strength during synchronization intervals rather than continuously) found in many television receivers. Alternatively, it is also possible to practice greater reductions in transmitted power but for shorter intervals on the order of several microseconds within a video line contained in a letterbox bar interval. For example, such brief but extreme (e.g. more than six dB) reductions in power by a cooperating television broadcast station could be induced or commanded by parts of the data stream from output Z as more fully described below.

Whether or not the above "Power Reduction #3" techniques are invoked in any particular instance can be a function of which entity (the television viewer or the concurrent RF spectrum user) is to be offered greater protection or priority of communication under a given set of circumstances (e.g. in emergencies or during periods of high communications traffic demand). As described later, in other embodiments, the concurrent RF spectrum user can communicate instructions to cooperating television broadcast stations on when to invoke power reduction modes, and the type and degree of reduction desired, whether automatic, scheduled or in real time.

The logic signal from output Y can also be used for the purposes of determining whether a video signal is already letterbox-formatted in accordance with the "letterbox formatted?" decision step 402 shown in FIG. 4. In a television broadcast station, the video signal for the video signal analyzer would preferably come directly from its incoming television program source, not a television demodulator. The logic state of output Y would allow the cooperating television station to know whether its incoming television program content is or is not already appropriately letterbox formatted in order to avoid automatic and redundant insertion of letterbox bars.

Similarly, the letterbox signal profile identifier can be used for the "letterbox formatted?" decision step 504 shown in FIG. 5 pertaining to cooperative cable television insertion of new letterbox bars. In that instance, knowledge of the logic state of output Y would allow unformatted programs to be automatically passed directly to the cable television channel modulator without unnecessary-intervention, as shown in FIG. 5.

Additional refinements can be implemented when more than one television broadcast station cooperates in transmitting their respective signal. Such stations can reside in adjacent or overlapping coverage areas that pose an additive ambient interference or receiver overload problem for concurrent RF spectrum users. In the cooperative environment, the timing of the letterbox bar lines transmitted by the cooperative television broadcast stations can be coordinated and time-synchronized among the stations to ensure that the letterbox bars are nominally coincident or offset in timing. This can be accomplished by phase-locking the synchronization pulses or frame-store synchronizing the composite video at cooperative stations and by introducing a time delay in the composite video at a selected cooperative station or stations, if desired. For example, coincident timing of typical black letterbox bars from multiple, collocated, high-power television stations might pose an additive ambient interference problem for nearby concurrent user receivers. By optionally allowing introduction of a fixed offset in timing at cooperative television broadcast stations, this problem can be avoided Conversely, if two or more cooperative television stations elect to transmit useful data, a coordinated dotting sequence, or other high-luminance elements during their respective letterbox intervals, or to marginally reduce power (erg. in response to output signal Y) then coincidentally-timed letterbox bars may prove to mitigate interference to concurrent RF spectrum users by creating low-interference "time windows" of opportunity.

The video signal analyzer 1114 of FIG. 11, also functions to extract optional data that can be embedded in the letterbox bar lines for use by concurrent RF spectrum users. The extracted data stream is represented by the output signal Z and can be contained in and demodulated from the video luminance signal, chrominance signal, and/or any subcarriers. The original source of the data may be a programmed code (including pseudorandom code and/or codes with a high degree of orthogonality) installed at cooperating television broadcast stations. The data's source can conjunctively or alternatively be a data link (e.g. user data for the downlink) from the concurrent RF spectrum user base station or stations.

The data stream Z, which can have a concurrent RF spectrum user as its originator, can also optionally be used to instruct a television broadcast station to reduce its continuous wave power output as described in relation to those embodiments using the "Power Reduction #3" mode during letterbox bar time intervals or parts thereof. The "power controller for visual carrier power reduction during the letterbox time intervals" features shown in FIG. 4 can be driven by (i.e., connected to and made logically responsive to) the output data stream Z.

Returning, once again, to FIG. 11, the output signal X is provided by the AND gate 1110. The inputs to the AND gate 1110 are the signals W and Y, and, as typical with AND gates, X will be in a logic-high state only when both signals W and Y are active (i.e., the logical intersection of signals W and Y). Thus the output signal X will be in a logic-high state only when the instantaneous video voltage (IRE level) is within the range selected and the corresponding video line is contained within a letterbox bar interval. One reason for having this logical algorithm that produces signal X is that letterbox bars are often not purely black or standard. They may contain other video content, including graphic effects, stationary service marks, etc. that would need to be protected from objectionable interference that would otherwise be caused by concurrent RF spectrum users. Yet parts of those same bars are often "filler" containing no information. The signal X will allow concurrent user RF emissions to be keyed "on" during the letterbox bar intervals but only when the instantaneous video content within the bars is within the particular IRE range or ranges selected so as not to interfere with protected visible elements within said letterbox bars.

Referring to the circuitry of FIG. 12, output signals Y' and W' are provided to the AND gate 1224 to produce the output signal X'. Similar to the above description of the signal X, the output signal X' will be in a logic-high state only when the instantaneous video voltage (IRE level) is within the ranges selected and the corresponding video line is contained within a letterbox bar interval.

The circuits of FIGS. 10 and 11 (and FIG. 12) can be contained within a concurrent user base station, a remote terminal station, a broadcast television station, or a cable television station As an alternative, the remote terminal embodiment of FIG. 8 assumes that the remote terminal does not process the television signal, directly. Instead, in this embodiment the remote terminal station relies on signals transmitted from the concurrent user base station. These transmitted signals, for example, can instruct and allow the remote terminal to locally regenerate the output signals of FIG. 11.

As a geographic region may have more than one television broadcast signal that could cause interference with or suffer interference from a concurrent RF spectrum user, the circuitry of FIGS. 10–12 can easily be replicated, with one set of circuitry for each different television broadcast signal, to provide control signals that depend jointly on the more than one broadcast signals and, thereby, mitigate interference between a concurrent RF spectrum user and multiple broadcast television signals.

Figure 13A:
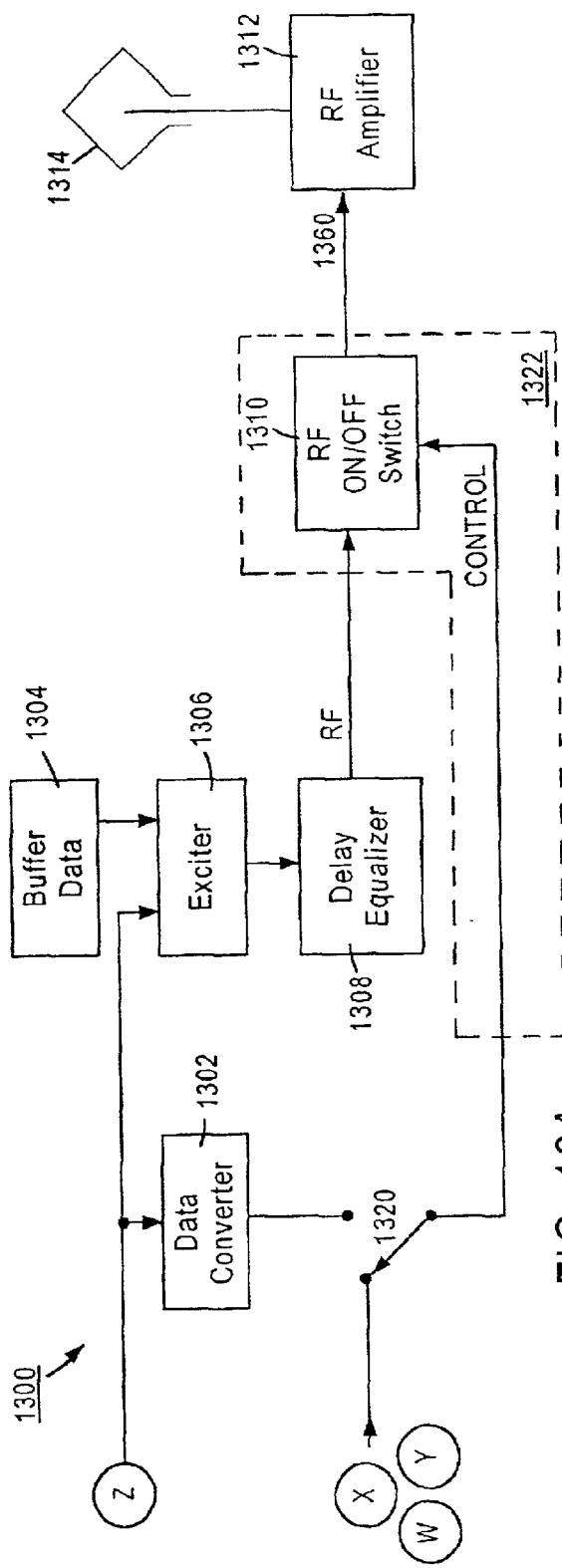
FIGS. 13A and 13B illustrate a concurrent RF user transmitter and an accompanying RF switch according to an embodiment of the invention.

An exemplary transmitter 1300 for a concurrent RF spectrum user is depicted in FIG. 13A. This transmitter 1300 could be included in, for example, a remote terminal station or a base station.

The transmitter exciter 1306 includes all the circuitry typically required for any analog or digital radio transmitter system except for the final power amplifier stages. The exciter 1306 produces an RF signal modulated with the user's data 1304 that is desired to be communicated for any of a variety of suitable purposes, and/or modulated with the data Z optionally contained in letterbox bar lines. The data 1304 preferably is flow-controlled and buffered using memory (not shown) or equivalent means such that the data 1304 enters the transmitter 1300 only when the transmitter 1300 is in an on state (i.e., is RF emitting). The flow control would preferably be achieved by coordinating the data flow using one or more of the logic signals (W, X, Y, and Z) as selected by the user, together with the data buffering memory. This control and data rate must be sufficiently fast to achieve useful data throughput during the concurrent user transmitter on intervals, which in an example case of an NTSC standard video signal, would be on the order of 63.5 microseconds per video line. In addition, if desired, the flow control and data rate would be sufficiently fast to achieve useful data throughput during the transmitter on intervals that briefly but repetitively occur during blanking and/or synchronization. Furthermore, the flow control and data rate is preferably fast enough to achieve useful data throughput during small fractions of video line time. In wideband spread spectrum or ultra-wideband embodiments, these fractions could be on the order of nanoseconds or picoseconds or shorter. In a preferred receiver embodiment, described later, the above-described on/off data flows would also be buffered and stored at the receiver in order to facilitate aggregation and proper reassembly of the received data, including prioritization and sequential reordering of bits for the data thus conveyed.

The RF output of the exciter 1306 passes through a propagation delay equalizer 1308 as shown in FIG. 13A. In operation, there will likely be some variation in signal arrival times due to propagation delays and other signal delays, including device-caused delays. To ensure that such variations do not increase interference problems, it is possible to restrict concurrent users to the central portions of letterbox bar intervals, blanking intervals, or to the central portions of the time slots allotted to any desired transmission and/or reception "on" state.

Continuing with FIG. 13A, the modulated RF signal from the transmitter exciter 1306 and the delay equalizer 1308 is connected to an RF on/off switch 1310 that is controlled by any one of the binary signals (e.g., W, X or Y) developed from the video signal V and which serve as inputs to the transmitter 1300. The data from the input signal Z, through a data-to-logic converter 1302, can also optionally be used to control the RF on/off switch 1310. The user chooses from among the inputs W, X, Y and optionally Z for the desired logical algorithm for the on/off function, or the choice could be pre-programmed into the transmitter apparatus prior to delivery to an end user.

As previously described, connecting input W, through the switch 1320, would facilitate control of the concurrent user RF emissions in an on-off manner in accordance with whether the video signal is within the user-selected video voltage reference range or ranges at any instant, which would cause a logic-high state and thus an "on" condition.

Alternatively, connecting the input Y, through the switch 1320, would facilitate control of concurrent user RF emissions in an on-off manner synchronized with the presence of letterbox-formatted frame-bar lines (of any desired and programmed definition) in the video signal V. The presence of a letterbox bar would cause a logic-high state and thus an "on" condition during the corresponding letterbox bar video lines. The use of the input Y is a preferred choice for allowing concurrent RF user transmissions during letterbox bar intervals. The RF switching speeds using input Y are easily achieved and do not appreciably increase the emitted bandwidth of a typical spread spectrum communications system.

A third alternative is input X, which is logically equivalent to input (W AND Y). Connecting input X, through the switch 1320, would facilitate on-off control of the concurrent user's RF emissions, turning emissions on when the video signal level is instantaneously within the selected IRE voltage range or ranges and within a letterbox bar. A logic high state at input signal X would indicate that this logical "and" condition has been met at a given instant, thus keying the concurrent user transmitter on for the duration of the logic high state. This alternative allows concurrent user RF emissions only during parts of the letterbox bar intervals when the instantaneous content of those bars is within a video IRE range or ranges that will not be visibly impaired to an objectionable extent by interference from concurrent user RF emissions. It allows for the concurrent use of the parts of letterbox bar time intervals that generally contain no useful information, while protecting the parts of the letterbox bars that may have useful visible content.

Figure 13B:
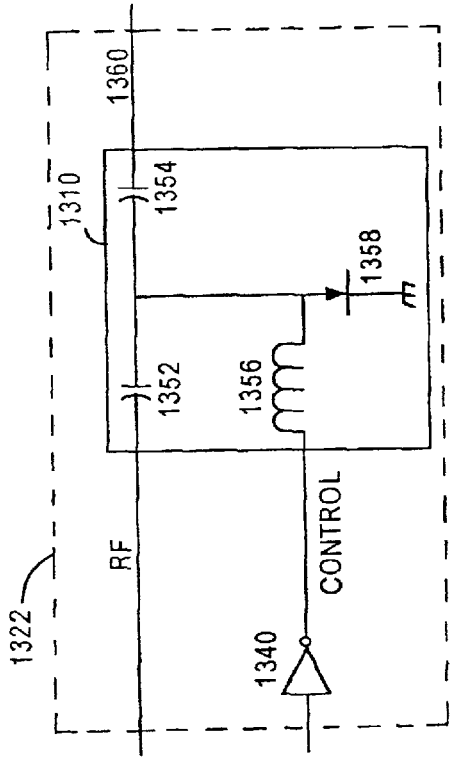

FIG. 13B illustrates a specific exemplary concurrent-user transmitter on/off RF switching system 1322 that could use any one of the inputs W, X, Y or Z. The binary logic signal from any one of these inputs is inverted by the logic inverter 1340 and connected to the control port of the RF on/off switch 1310. The modulated RF signal to be switched is connected to the RF on/off switch 1310 input port, as shown.

In the example of FIG. 13B, the RF on/off switch 1310 uses a positive intrinsic negative (PIN) diode 1358 in a shunt-to-ground configuration to switch the RF signal on and off. The PIN diode 1358 is of the type typically used for RF switching and attenuation, and it is not necessary to use the type constructed specifically for photodiode applications. The PIN diode 1358 preferably has an RF resistance that is inversely related to the instantaneous DC bias voltage or current applied to it. Inductance 1356 is an RF choke that offers high impedance to RF and prevents the input RF signal from being coupled to the logic circuitry of FIGS. 11 and 12. The capacitors 1352 and 1354 offer low impedance to the RF signal flow but high impedance to the switched direct current of the binary logic signals. The logic signals (e.g. W, X, Y, Z) represent a switched direct current bias for the PIN diode 1358.

In operation, when the binary logic level of the selected input (W, X or Y), as inverted by the logic inverter 1340, is in a logic-low state (e.g., low or zero volts), the low logic voltage level causes no significant forward bias current through the PIN diode 1358, in which state the PIN diode 1358 becomes a high resistance or impedance to the input RF signal, thus not allowing the PIN diode 1358 to short the input RF signal to ground, and permitting the RF signal 1360 to pass out of the RF on/off switch 1310 to the amplifier.1312. This corresponds to the transmit "on" state.

Conversely, when the inverted binary logic level is in a logic-high state, the PIN diode 1358 is forward biased, offers low resistance or impedance to RF, and effectively shunts the input RF signal to ground, preventing it from being output by the RF on/off switch 1310. This corresponds to the transmit "off" state.

The input Z (i.e., the data optionally contained in the letterbox bar lines) can also be used to control the transmitter 1300 on-off switching. In this optional configuration, the switch 1320 is switched to connect to the output of the data-to-logical converter 1302. Thus, the RF on/off switch 1310 would respond to the binary logic levels (which can be inverted if needed) from the converter 1302 and would switch the RF signal on and off in the same manner described above. One benefit of using the input signal Z is that the data on that input will be precisely contained within the time intervals of the letterbox bar video lines if the data was originally part of the television signal and within the letterbox bar time intervals as broadcast.

RF on-off switching can confine the concurrent user's emissions to times when the video IRE level is within the range or ranges desired (i.e., using signal W), or it can confine the emissions to the letterbox bar time intervals (i.e., using signal Y), or it can confine the emissions to letterbox bar time intervals but only during video lines, line segments or other intervals where the IRE level is within a selected range or ranges (i.e., using signal X), or it can switch emissions on and off in accordance with data contained in the letterbox bar lines (i.e., using signal Z).

Ultimately, the RF amplifier stage 1312, typical of conventional RF transmitters, is used to increase the power of the RF signal 1360 which is then radiated from the transmit antenna 1314 and propagated as a radio wave from the concurrent RF spectrum user's transmitter 1300.

Those skilled in the art will recognize that in practice any suitably responsive RF switching methods or devices can be used. The circuits presented here represent illustrative examples and are not meant to exclude other methods and devices suitable to practice the invention. This invention also contemplates and includes future advances in device characteristics such as faster switching speeds and slew rates, digitizing, lower noise and wide bandwidths that will allow higher speed operation. The logical signals, video levels, and RF responses described herein could be equally as useful if implemented as their complements or as their inverted forms in many applications depending upon which user entity is to be afforded greater protection from RF interference. While the examples used herein employ NTSC-based conventions for video transmission, the principles are equally applicable to other international standards. Alternative standards that employ non-inverted video transmission, different modulation levels, etc., could be accommodated by using properly inverted and/or scaled signals in the devices described herein in order to achieve comparable results.

An exemplary receiver 1400 for a concurrent RF spectrum user is depicted in FIG. 14A. This receiver 1400 could be, for example, part of a remote terminal station, a base station, a cable television station or a broadcast television station and may be co-located, in a transceiver configuration, with a conventional RF transmitter or with an RF transmitter as described earlier in relation to FIG. 13A.

The exemplary receiver 1400 depicted in FIG. 14A bears several similarities with the transmitter shown in FIG. 13A. However, in the receiver example, a conveyed RF signal from, for example such a transmitter, which has propagated some distance, impinges upon the receive antenna 1402 and thereby induces an RF signal. The receive antenna 1402 is connected to the input of front-end stages 1404, as shown. This antenna 1402 and receiver front-end stages 1404 are the same as those typically part of a conventional RF receiver. The front-end stages 1404 serve to amplify received RF signals from the receive antenna 1402 that are generally within a desired radio band or bands.

Next, the received RF signal is connected to an RF on/off switch 1406 that is controlled by any one of the binary logic signals W, X or Y described earlier. Using the selector switch 1414, the data from input signal Z, through the data-to-logic-level converter 1416, can also optionally be used for on-off control of the switch 1406.

The received RF signal also passes through a propagation delay equalizer 1408. In operation, there will likely be some variation in signal arrival times due to propagation delays and other signal delays, including device-caused delays. To ensure that such variations do not increase interference problems, it is possible to restrict concurrent users to the central portions of letterbox bar intervals, blanking intervals, or to central portions of the time slots allotted to any desired transmission and/or reception.

The received RF signal then passes from the equalizer 1408 to the detector, correlator and demodulator stages 1410 of the concurrent RF spectrum user's receiver 1400 and all of the other circuitry normally associated with an analog or digital radio receiver system. The receiver 1400 has at its output the user data 1412 that is desired to be communicated, which can be for any suitable purpose. The data 1412 can also consist of the data optionally contained in the letterbox bar lines but that was conveyed over the concurrent user air-link. These two different data flows can be used separately or together for any suitable purposes intended by the user.

The user data 1412 desired to be communicated is preferably flow-controlled and buffered using data memory (not shown) or equivalent means. The flow control would preferably be achieved by coordinating the data flow using one or more of the logic signals (W, X, Y, and Z) as selected by the user, together with the data buffering memory. This control and data rate must be sufficiently fast to achieve useful data throughput during the concurrent user transmitter on intervals, which in an exemplary case of an NTSC standard video signal, would be on the order of 63.5 microseconds per video line. In addition, if desired, the flow control and data rate would be sufficiently fast to achieve useful data throughput during the transmitter on intervals that briefly but repetitively occur during blanking and/or synchronization. Furthermore, the flow control and data rate is preferably fast enough to achieve useful data throughput during small fractions of video line time. In wideband spread spectrum or ultrawideband embodiments, these fractions could be on the order of nanoseconds or picoseconds or shorter. In a preferred embodiment, the above-described on/off data flows would also be buffered and stored at the receiver 1400 in order to facilitate aggregation and proper reassembly of the received data 1412, including prioritization and sequential reordering of bits for the data thus conveyed.

In the exemplary receiver 1400 of FIG. 14A, there are four available logical sources which can key the receiver 1400 on and off. The user could choose from among W, X, Y or optionally Z for the desired logical algorithm for the on-off function. The particular signal chosen would preferably correspond with the input or inputs selected by associated transmitter circuitry, as described earlier.

Connecting input W, through the switch 1414, would facilitate control of the concurrent user RF receiver in an on-off manner in accordance with whether the video signal is within the user-selected video voltage reference range or ranges at any instant, which would cause a logichigh state and thus an "on" condition.

Alternatively, connecting the input Y, through the switch 1414, would facilitate control of the concurrent user RF receiver in an on-off manner synchronized with the presence of letterbox-formatted frame-bar lines (of any desired and programmed definition) in the video signal V. The presence of a letterbox bar would cause a logic-high state and thus an "on" condition during the corresponding letterbox bar video lines. The use of the input Y is a preferred choice for allowing concurrently RF user reception during letterbox bar intervals. The RF switching speeds using input Y are easily achieved and do not appreciably increase the emitted bandwidth of a typical spread spectrum communications system.

A third alternative is input X, which is logically equivalent to the logical intersection of the signals W and Y (i.e., W AND Y). Connecting input X, through the switch 1414, would facilitate on-off control of the concurrent user's RF receiver, turning the receiver on when the video signal level is instantaneously within the selected IRE voltage range or ranges and within a letterbox bar. A logic high state at input signal X would indicate that this logical "and" condition has been met at a given instant, thus keying the concurrent user receiver on for the duration of the logic high state. This alternative allows concurrent user RF reception only during the corresponding parts of the letterbox bar intervals.

FIG. 14B illustrates a specific exemplary concurrent user receiver on-off switching system 1422 that could use any one of the inputs W, X, Y or Z. The binary logic signal from any one of these inputs is inverted by the logic inverter 1440 and connected to the control port of the RF on/off switch 1406, as shown. Also, as shown, the received RF signal to be switched is connected to the RF on/off switch input port.

In the circuitry of FIG. 14B, the RF on/off switch 1406 uses a positive intrinsic negative (PIN) diode 1458 in a shunt-to-ground configuration to switch the RF signal on and off. The PIN diode 1458 is of the type typically used for RF switching and attenuation, and it is not necessary to use the type constructed specifically for photodiode applications. The PIN diode 1458 preferably has an RF resistance that is inversely related to the instantaneous DC bias voltage or current applied to it. Inductance 1456 is an RF choke that offers high impedance to RF and prevents the input RF signal from being coupled to the logic circuitry of FIGS. 11 and 12. The capacitors 1452 and 1454 offer low impedance to the RF signal flow but high impedance to the switch direct current of the binary logic signals. The logic signals (e.g. W, X, Y, Z) represent a switched direct current bias for the PIN diode 1458.

In operation, when the binary logic level of the selected input (W, X or Y), as inverted by the logic inverter 1440, is in a logic-low state (e.g., low or zero volts), the low logic voltage level causes no significant forward bias current through the PIN diode 1458, in which state the PIN diode 1458 becomes a high resistance or impedance to the input RF signal, thus not allowing the PIN diode 1458 to short the input RF signal to ground, and permitting the RF signal 1460 to pass out of the RF on/off switch 1406 to the equalizer 1408. This corresponds to the receive "on" state. Conversely, when the inverted binary logic level is in a logic-high state, the PIN diode 1458 is forward biased, offers low resistance or impedance to RF, and effectively shunts the input RF signal to ground, preventing it from being output by the RF on/off switch 1406. This corresponds to the receive "off" state.

The input Z (i.e., the data optionally contained in the letterbox bar lines) can also be used to control the receiver 1400 on-off switching. In this optional configuration, the switch 1414 is switched to connect to the output of the data-to-logical converter 1416. Thus, the RF on/off switch 1406 would respond to the binary logic levels (which can be inverted if needed) from the converter 1416 and would switch the RF signal on and off in the same manner described above. One benefit of using the input signal Z is that the data on that input will be precisely contained within the time intervals of the letterbox bar video lines if the data was originally part of the television signal and within the letterbox bar time intervals as broadcast.

RF on-off switching can confine the concurrent user's reception to times when the video IRE level is within the range or ranges desired (i.e., using signal W), or it can confine the reception to the letterbox bar time intervals (i.e., using signal Y), or it can confine the reception to letterbox bar time intervals but only during video lines, line segments or other intervals where the IRE level is within a selected range or ranges (i.e., using signal X), or it can switch reception on and off in accordance with data contained in the letterbox bar lines (i.e., using signal Z).

The on-off states of the example RF on/off switches 1310 and 1406 in FIGS. 13A and 14A can be time coincident for concurrent RF user transmit and receive for instances where a base station transmitter is conveying user data to a remote concurrent user receive terminal and also for instances where a remote transmitter terminal is conveying user data to a base station. Within a transceiver, where both transmitter and receiver are housed in the same enclosure, however, transmit and receive timing is not necessarily coincident within the device. For example, transmit and receive timing of transmission and reception in each communications path (e.g., uplink vs. downlink) can be independent, such as when the on-off timing of the communications on each path is synchronized to aspects of a different television station's video signal or synchronized to different parts of the same television station's video signal. As a further example in applications using time division duplex (TDD), transmit and receive timing may be opposite and complimentary within the device, as could be the case if logic the inverter (1440 of FIG. 14B) was omitted and electrically bypassed.

Those skilled in the art will recognize that in practice any suitably responsive RF switching methods or devices can be used. The circuits presented here represent illustrative examples and are not meant to exclude other methods and devices suitable to practice the invention. This invention also contemplates and includes future advances in device characteristics such as faster switching speeds and slew rates, digitizing, lower noise and wide bandwidths that will allow higher speed operation. The logical signals, video levels, and RF responses described herein could be equally as useful if implemented as their complements or as their inverted forms in many applications depending upon which user entity is to be afforded greater protection from RF interference. While the examples used herein employ NTSC-based conventions for video transmission, the principles are equally applicable to other international standards. Alternative standard that employ non-inverted video transmission, different modulation levels, etc., could be accommodated by using properly inverted and/or scaled signals in the devices described herein in order to achieve comparable results.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein.

I claim:

1. A radio-frequency transmitting apparatus that can operate concurrently with a television broadcast, comprising:
    detector circuitry configured to generate at least one control signal based on a current video signal of the television broadcast to indicate a transmitting timing interval for radio-frequency signal transmission in relation to current timing of the video signal;
    an exciter configured to generate a radio-frequency signal separate from the video signal, said radio-frequency signal and television broadcast having sufficient spectral proximity to potentially cause interference;
    an antenna coupled with the exciter and configured to receive the radio-frequency signal and to transmit the radio-frequency signal; and
    a controller coupled to the control circuitry and coupled to the exciter, said controller configured, in a first operating mode, to enable forwarding of the generated radio-frequency signal to the antenna and, in a second operating mode, to prevent any generated radio-frequency signal from being transmitted by the antenna, wherein the operating mode of the controller is selectable based on the at least one control signal to activate the first operating mode during the transmitting timing interval.

2. The radio-frequency transmitting apparatus according to claim 1, further comprising:
    a receiver coupled with the control circuitry and configured to receive the current video signal and forward the received video signal to the detector circuitry.

3. The radio-frequency transmitting apparatus according to claim 2, wherein:
    the detector circuitry is further configured to determine at least one of:
        a first time interval when the received video signal corresponds to letter-box bars, and
        a second time interval when a voltage level of the received video signal is within a specified range; and
    wherein the transmitting timing interval substantially coincides with at least one of the first time interval and the second time interval.

4. The radio-frequency transmitting apparatus according to claim 3, wherein the transmitting timing interval substantially coincides with a logical intersection of the first time interval and the second time interval.

5. The radio-frequency transmitting apparatus according to claim 3, wherein the specified range comprises a plurality of different sub-ranges.

6. The radio-frequency transmitting apparatus according to claim 3, wherein the transmitted radio-frequency signal includes an associated priority level and the specified range is based on the associated priority level.

7. The radio-frequency transmitting apparatus according to claim 3, wherein the specified range is based on a geographical location of the transmitting apparatus.

8. The radio-frequency transmitting apparatus according to claim 2, further comprising:
    a data separator coupled with the receiver and configured to extract data embedded in a predetermined portion of the received video signal, said extracted data identifying the transmitting timing interval.

9. The radio-frequency transmitting apparatus according to claim 8, wherein the at least one control signal comprises a first control signal based on the extracted data.

10. The radio-frequency transmitting apparatus according to claim 8, wherein the predetermined portion of the received video signal corresponds to letter-box bars.

11. The radio-frequency transmitting apparatus according to claim 1, wherein the transmitting apparatus is a cellular base station.

12. The radio-frequency transmitting apparatus according to claim 1, wherein the transmitting apparatus is a mobile cellular station.

13. A radio-frequency receiving apparatus operating concurrently with a television broadcast, comprising:
    detector circuitry configured to generate at least one control signal based on a current video signal of the television broadcast to indicate a reception timing interval for radio-frequency signal reception in relation to current timing of the video signal;
    one or more front-end stages configured to generate a radio-frequency signal from a received signal, said received signal being distinct from the video signal, and said received signal and television broadcast having sufficient spectral proximity to potentially cause interference;
    a demodulator configured to receive and convert the generated radio-frequency signal into data;
    a controller coupled to the detector circuitry and coupled to the front-end stages, said controller configured, in a first operating mode, to enable forwarding of the generated radio-frequency signal to the demodulator and, in a second operating mode, to prevent the generated radio-frequency signal from being forwarded to the demodulator, wherein the operating mode of the controller is selectable based on the at least one control signal to activate the first operating mode during the reception timing interval.

14. The radio-frequency receiving apparatus according to claim 13, further comprising:
    a video signal receiver coupled with the detector circuitry and configured to receive the current video signal and forward the received video signal to the detector circuitry.

15. The radio-frequency receiving apparatus according to claim 14, wherein the detector circuitry is further configured to determine at least one of:
    a first time interval when the received video signal corresponds to letter-box bars, and
    a second time interval when a voltage level of the received video signal is within a specified range; and
    wherein the reception timing interval substantially coincides, with at least one of the first time interval and the second time interval.

16. The radio-frequency receiving apparatus according to claim 15, wherein the reception timing interval substantially coincides with a logical intersection of the first time interval and the second time interval.

17. The radio-frequency receiving apparatus according to claim 15, wherein the specified range comprises a plurality of different sub-ranges.

18. The radio-frequency receiving apparatus according to claim 15, wherein the received radio-frequency signal includes an associated priority level and the specified range is based on the associated priority level.

19. The radio-frequency receiving apparatus according to claim 15, wherein the specified range is based on a geographical location of the receiving apparatus.

20. The radio-frequency receiving apparatus according to claim 14, further comprising:
a data separator coupled with the video signal receiver and configured to extract data embedded in a portion of the received video signal.

21. The radio-frequency receiving apparatus according to claim 20, wherein the at least one control signal comprises a first control signal based on the extracted data, said extracted data identifying the reception timing interval.

22. The radio-frequency receiving apparatus according to claim 20, wherein the portion of the received video signal corresponds to letter-box bars.

23. The radio-frequency receiving apparatus according to claim 13, wherein the receiving apparatus is a cellular base station.

24. The radio-frequency receiving apparatus according to claim 13, wherein the receiving apparatus is a mobile cellular station.

25. The radio-frequency receiving apparatus according to claim 13, further comprising:
a radio-frequency receiving antenna configured to receive a signal separate from the video signal and forward the received signal to the front-end stages; and
a front-end controller, coupled to the detector circuitry and coupled between the front-end stages and the radio-frequency receiving antenna, said controller configured, in a third operating mode, to enable forwarding of the received separate signal to the front-end stages and, in a second operating mode, to preventing forwarding of the received separate signal to the front-end stages, wherein the operating mode of the switch is selectable based on the at least one control signal to activate the third operating mode during the reception timing interval.

26. A system for concurrent use of a portion of the radio-frequency, said system comprising:
a broadcast television transmitter configured to transmit a television signal, said television signal comprising a picture portion and a non-picture portion of a predetermined format; and
a concurrent user apparatus, comprising:
a transceiver configured to transmit and receive respective radio-frequency signals, said signals being distinct from the broadcast television signal, and said signals and said television signal having sufficient spectral proximity to potentially cause interference with reception of the other;
a video signal receiver configured to receive a current video signal of the television signal;
detector circuitry coupled to the video signal receiver and the transceiver and configured to generate at least one control signal based on the received current video signal to indicate an acceptable timing interval for transceiver operation in relation to current timing of the video signal; and
wherein at least one of reception and transmission of respective radiofrequency signals by the transceiver is selectably enabled for operation during the acceptable timing interval according to the at least one control signal.

27. The system according to claim 26, wherein the non-picture portion of the television signal is broadcast at a first power level and the picture portion is broadcast at a second power level, the first power level being less than the second power level.

28. The system according to claim 26, further comprising:
a cable-television headend configured to receive the television signal and to replace the non-picture portion of the received television signal with video signals generated locally at the headend.

29. The system according to claim 26, wherein the non-picture portion comprises at least one letter-box bar.

30. The system according to claim 29, wherein a portion of the at least one letter-box bar is broadcast at an amplitude modulation level less than a conventional amplitude modulation level for standard letter-box bars.

31. The system according to claim 29, wherein a portion of the at least one letter-box bar includes an interference minimizing code.

32. The system according to claim 26, wherein the respective transmitted radio-frequency signals from the transceiver include instruction data transmitted to the broadcast television transmitter, wherein the instruction data relates to one or more of timing, modulation and power of the television signal.

33. The system according to claim 26, wherein the respective transmitted radio-frequency signals from the transceiver include instruction data transmitted to a mobile cellular station, wherein the instruction data relates to enabling operation of the mobile cellular station during a predetermined period of the television signal.

34. A method of operating a radio frequency transmitting apparatus concurrently with a television broadcast, comprising the steps of:
receiving a current video signal of the television broadcast at the transmitting apparatus;
determining a first set of one or more time intervals in which the received video signal corresponds to a letter-box bar portion of the television broadcast; and
enabling transmission of a radio-frequency signal from the transmitting apparatus only during the first set of one or more time intervals and disabling transmission of the radio-frequency signal from the transmission apparatus otherwise, said radio-frequency signal and said television broadcast having sufficient spectral proximity to potentially cause interference.

35. The method according to claim 34, further comprising the steps of:
determining a second set of one or more time intervals when a voltage level of the received video signal is within a specified range; and
enabling transmission of the radio-frequency signal from the transmitting apparatus only during periods where the first and second sets of time intervals coincide.

36. The method according to claim 35, further comprising the step of:
identifying the specified range based on one of:
a priority level associated with the transmitted radio-frequency signal, and
a geographical location of the transmitting apparatus.

37. The method according to claim 34, wherein the transmitting apparatus is a cellular base station.

38. The method according to claim 34, wherein the transmitting apparatus is a mobile cellular station.

39. The method according to claim 34, wherein the transmitted radio-frequency signal comprises data intended for at least one of a cellular base station and a mobile cellular station.

40. A method of operating a radio frequency transmitting apparatus concurrently with a television broadcast, comprising the steps of:

receiving a current video signal of the television broadcast at the transmitting apparatus;

extracting data embedded in a portion of the received video signal;

based on the extracted data, identifying a time interval of the video signal; and enabling transmission of a radio-frequency signal from the transmitting apparatus only during the identified time interval and disabling transmission of the radio-frequency signal from the transmitting apparatus otherwise, said radio-frequency signal and said television broadcast having sufficient spectral proximity to potentially cause interference.

41. The method according to claim 40, further comprising the steps of:

determining if the received video signal corresponds to a letter-box bar portion or a picture portion of the television broadcast; and performing the step of extracting data only when the received video signal corresponds to the letter-box portion.

42. A method of operating a radio frequency receiving apparatus concurrently with a television broadcast, comprising the steps of:

receiving a current video signal of the television broadcast at the receiving apparatus;

determining a first set of one or more time intervals when the received video signal corresponds to a letter-box bar portion of the television broadcast; and enabling reception of a radio-frequency signal at the receiving apparatus during the first set of one or more time intervals and disabling reception of the radio-frequency signal at the receiving apparatus otherwise, said received radio-frequency signal and said television broadcast having sufficient spectral proximity to potentially cause interference.

43. The method according to claim 42, further comprising the steps of:

determining a second set of one or more time intervals when a voltage level of the received video signal is within a specified range; and activating reception of the radio-frequency signal only during time periods when the first and second sets of time intervals coincide.

44. The method according to claim 43, further comprising the step of:

identifying the specified range based on one of:
a priority level associated with the received radio-frequency signal, and
a geographical location of the receiving apparatus.

45. The method according to claim 42, wherein the receiving apparatus is a cellular base station.

46. The method according to claim 42, wherein the receiving apparatus is a mobile cellular station.

47. The method according to claim 42, wherein the received radio-frequency signal comprises data intended for at least one of a cellular base station and a mobile cellular station.

48. A method of operating a radio frequency receiving apparatus concurrently with a television broadcast, comprising the steps of:

receiving a current video signal of the television broadcast at the receiving apparatus;

extracting data embedded in a portion of the received video signal;

based on the extracted data, identifying a time interval of the video signal; and enabling reception of a radio-frequency signal from the receiving apparatus only during the identified time interval and disabling reception of the radio-frequency signal at the receiving apparatus otherwise, said radio-frequency signal and said television broadcast having sufficient spectral proximity to potentially cause interference.

49. The method according to claim 48, further comprising the steps of:

determining if the received video signal corresponds to a letter-box bar portion or a picture portion of the television broadcast; and performing the step of extracting data only when the received video signal corresponds to the letter-box portion.

50. A method of operating a radio frequency transceiver apparatus concurrently with a television broadcast, comprising the steps of:

receiving a current video signal of the television broadcast at the transceiver apparatus, said received video signal comprising a picture portion and a non-picture portion, said non-picture portion having a predetermined format;

determining one or more time intervals when the received video signal corresponds to the non-picture portion; and enabling operation of one or both of a transmitter and receiver of the transceiver only during the one or more time intervals and disabling the operation of one or both of the transmitter and receiver otherwise.

51. The method according to claim 50, wherein the non-picture portion comprises one or more letter-box bar regions.

52. The method according to claim 50, wherein the transceiver apparatus comprises one of a cellular base station and a mobile cellular station.

53. The method according to claim 50, further comprising the steps of:

determining another one or more time intervals when a voltage level of the received video signal is within a specified range;

generating a second control signal, said second control signal having an active state during the another one or more time intervals; and enabling operation of one or both of the transmitter and the receiver of the transceiver only during time periods when the one or more time intervals and the another one or more time intervals coincide and disabling operation of one or both of the transmitter and the receiver otherwise, wherein, when activated, the transmitter transmits radio-frequency signals and-the receiver receives radio-frequency signals, both the transmitted and received radio-frequency signals having sufficient spectral proximity to potentially interfere with the television broadcast.

54. A method of operating a radio frequency transceiver apparatus concurrently with a television broadcast, comprising the steps of:

receiving a current video signal of the television broadcast at the transceiver apparatus;

determining one or more time intervals when a voltage level of the received video signal is within a specified range; and enabling operation of one or both of a transmitter and receiver of the transceiver only during the one or more time intervals and disabling the operation of one or both of the transmitter and receiver otherwise, wherein, when activated, the transmitter transmits radio-frequency signals and the receiver receives radio-frequency signals, both having sufficient spectral proximity to potentially interfere with the television broadcast.

55. A method for a concurrent apparatus and a plurality of television transmitters, each television transmitter transmitting a respective television signal, to concurrently and simultaneously use spectrally proximate portions of the radio-frequency spectrum, said method comprising the steps of:

broadcasting each of the respective television signals, each of said television signals comprising a non-picture portion and a picture portion;

receiving at the concurrent apparatus a current video signal corresponding to one of the respective broadcast television signals;

determining one or both of:

a first time interval when the received video signal corresponds to the non-picture portion; and a second time interval when a voltage level of the received video signal is within a specified range of voltages;

enabling operation of one or both of a transmitter and a receiver of the concurrent apparatus during at least one of the first and second time intervals and disabling operation of one or both of the transmitter and the receiver otherwise, wherein, when activated, the transmitter transmits radio-frequency signals and the receiver receives radio-frequency signals.

56. The method according to claim 55, wherein the step of broadcasting the respective television signals, includes the step of:

broadcasting the non-picture portion at a first power level and the picture portion at a second power level, the first power level being less than the second power level.

57. The method according to claim 55, wherein the non-picture portion comprises one or more letter-box bar regions.

58. The method according to claim 57, wherein the step of broadcasting the respective television signals, includes the step of:

broadcasting the one or more letter-box regions at an amplitude modulation level less than a conventional amplitude modulation level for standard letter-box bars.

59. The system according to claim 57, wherein a portion of the one or more letter-box bar regions include an interference minimizing code.

60. The method according to claim 55, further comprising the step of:

synchronizing the broadcasting of two or more of the television signals so that respective non-picture portions are not simultaneously broadcast.

61. The method according to claim 55, further comprising the step of:

synchronizing the broadcasting of two or more of the television signals so that respective non-picture portions are simultaneously broadcast.

62. The method according to claim 55, further comprising the steps of:

receiving one or more of the television signals at a cable-television head end; and replacing any formatted portions of the received television signals with locally generated video signals.

63. The method according to claim 55, further comprising the step of:

synchronizing the broadcasting of two or more of the television signals.

64. The method according to claim 63, wherein the step of synchronizing includes one or more of the following steps:

ensuring a highest luminance portion of each of the two or more television signals are substantially time-coincident; and preventing one or more of a lowest luminance portion, a most repeated portion, and a continuous portion of each of the two or more television signals from being substantially time-coincident.

65. The method according to claim 55, wherein transmitted radio-frequency signals from the concurrent apparatus include instruction data transmitted to one or more of the television transmitters, wherein the instruction data relates to one or more of timing, modulation and power of the respective television signal of the one or more television transmitters.

66. The method according to claim 55, wherein the transmitted radio-frequency signals from the concurrent apparatus include instruction data transmitted to a mobile cellular station, wherein the instruction data relates to enabling operation of the mobile cellular station during a predetermined period of one or more of the respective television signals.

* * * * *